US012775862B2

(12) United States Patent
Yuan et al.

(10) Patent No.: US 12,775,862 B2
(45) Date of Patent: Oct. 27, 2026

(54) QUANTUM STATE PREPARATION CIRCUIT GENERATION METHOD AND APPARATUS, QUANTUM CHIP, AND ELECTRONIC DEVICE

(71) Applicant: TENCENT TECHNOLOGY (SHENZHEN) COMPANY LIMITED, Shenzhen (CN)

(72) Inventors: Pei Yuan, Shenzhen (CN); Shengyu Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 824 days.

(21) Appl. No.: 18/202,402

(22) Filed: May 26, 2023

(65) Prior Publication Data

US 2023/0351237 A1 Nov. 2, 2023

Related U.S. Application Data

(63) Continuation of application No. PCT/CN2023/084631, filed on Mar. 29, 2023.

(30) Foreign Application Priority Data

Apr. 29, 2022 (CN) ......................... 202210465928.1

(51) Int. Cl.
*G06N 10/20* (2022.01)
*G06N 10/60* (2022.01)

(52) U.S. Cl.
CPC ............. *G06N 10/20* (2022.01); *G06N 10/60* (2022.01)

(58) Field of Classification Search
CPC ............................... G06N 10/20; G06N 10/60
See application file for complete search history.

(56) References Cited

U.S. PATENT DOCUMENTS

2006/0123363 A1 6/2006 Williams et al.
2019/0384597 A1* 12/2019 Horesh .................. G06F 15/80
(Continued)

FOREIGN PATENT DOCUMENTS

CN 112633507 A 4/2021
CN 113592093 A 11/2021
(Continued)

OTHER PUBLICATIONS

International Search Report with English translation and Written Opinion regarding PCT/CN2023/084631 dated Jun. 21, 2023, 8 pages.

(Continued)

*Primary Examiner* — Nha T Nguyen
(74) *Attorney, Agent, or Firm* — Crowell & Moring LLP

(57) ABSTRACT

The present disclosure relates to a quantum state preparation circuit generation method and apparatus, a quantum chip, and an electronic device. The quantum chip may be applied to various intelligent terminals and on-board devices. The method includes: determining a first unitary operator respectively encoding $r_c$ qubits and $r_t$ qubits into a control register and a target register; acquiring at least two second unitary operators for performing phase shifting on the n qubits; determining a third unitary operator for replacing a qubit of the control register and a qubit of the target register; generating diagonal unitary matrix quantum circuits based on the first, second, third, fourth unitary operators, and a diagonal unitary matrix operator; combining the diagonal unitary matrix quantum circuits with a single-bit gate to obtain at least two uniform control gates; and combining the at least two uniform control gates into a quantum state preparation circuit.

20 Claims, 11 Drawing Sheets

(56) References Cited

U.S. PATENT DOCUMENTS

| | | | | |
|---|---|---|---|---|
| 2020/0005186 | A1* | 1/2020 | Romero | G06N 10/60 |
| 2021/0295194 | A1* | 9/2021 | Low | G06F 17/16 |
| 2021/0406753 | A1* | 12/2021 | Mosca | G06F 30/20 |
| 2023/0020166 | A1* | 1/2023 | Elfving | G06N 10/60 |
| 2023/0030423 | A1* | 2/2023 | Rubin | G06N 10/40 |
| 2023/0104058 | A1* | 4/2023 | Hopfmueller | G06N 10/60 714/10 |

FOREIGN PATENT DOCUMENTS

| | | | |
|---|---|---|---|
| CN | 113850389 | A | 12/2021 |
| JP | 2022-500743 | A | 1/2022 |

OTHER PUBLICATIONS

Japanese Office Action with English translation regarding Application No. 2023-553462 dated Sep. 26, 2024, 6 pages.

* cited by examiner

QUANTUM STATE PREPARATION CIRCUIT GENERATION METHOD AND APPARATUS, QUANTUM CHIP, AND ELECTRONIC DEVICE

RELATED APPLICATION

This application is a continuation application of PCT Patent Application No. PCT/CN2023/084631, filed on Mar. 29, 2023, which claims priority to Chinese Patent Application No. 202210465928.1, filed with the Chinese National Intellectual Property Administration on Apr. 29, 2022, both of which are incorporated herein by reference in their entireties.

FIELD OF THE TECHNOLOGY

The present disclosure relates to the field of quantum technologies, and in particular, to a quantum state preparation circuit generation method and apparatus, an electronic device, a storage medium, and a computer program product.

BACKGROUND OF THE DISCLOSURE

In the field of quantum technologies, it is often necessary to load classic data into a quantum state, and this process is referred to as quantum state preparation. The quantum state preparation process is an important process in the field of quantum technologies, and often occupies most of the operating time of quantum algorithms. Therefore, optimization of quantum state preparation contributes to improvement of the operating efficiency of quantum algorithms.

Currently, a circuit depth of a quantum state preparation circuit is $O(2^n)$, where, n is a quantity of qubits. Theoretically, a depth lower bound of the quantum state preparation circuit is $\Omega(2^n/n)$, that is, the existing quantum state preparation circuit is not a circuit with an optimal depth in the asymptotic sense and there is still a large room for improvement.

SUMMARY

Embodiments of the present disclosure provide a quantum state preparation circuit generation method and apparatus, an electronic device, a computer-readable storage medium, and a computer program product.

In a first aspect, the present disclosure provides a quantum state preparation circuit generation method, which is performed by an electronic device and includes:

- determining a first unitary operator corresponding to n qubits, the first unitary operator being used for respectively encoding $r_c$ qubits and $r_t$ qubits in the n qubits into a control register and a target register, and n being an integer greater than or equal to 2;
- acquiring at least two second unitary operators used for performing phase shifting on the n qubits;
- determining a third unitary operator used for replacing a qubit of the control register and a qubit of the target register with the $r_c$ qubits and the $r_t$ qubits;
- generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- combining the diagonal unitary matrix quantum circuits with a single-bit gate to obtain at least two uniform control gates; and
- combining the at least two uniform control gates into a quantum state preparation circuit.

In a second aspect, the present disclosure further provides a quantum state preparation circuit generation apparatus, which includes:

- a first determination module, configured to determine a first unitary operator corresponding to n qubits, the first unitary operator being used for respectively encoding $r_c$ qubits and $r_t$ qubits in the n qubits into a control register and a target register, and n being an integer greater than or equal to 2;
- a first acquisition module, configured to acquire at least two second unitary operators used for performing phase shifting on the n qubits;
- a second determination module, configured to determine a third unitary operator used for replacing a qubit of the control register and a qubit of the target register with the $r_c$ qubits and the $r_t$ qubits;
- a generation module, configured to generate diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- a first combination module, configured to combine the diagonal unitary matrix quantum circuits with a single-bit gate to obtain at least two uniform control gates; and
- a second combination module, configured to combine the at least two uniform control gates into a quantum state preparation circuit.

In a third aspect, the present disclosure further provides a quantum chip, which includes a quantum state preparation circuit. The quantum state preparation circuit is implemented by a quantum state preparation circuit generation method including:

- determining a first unitary operator corresponding to n qubits, the first unitary operator being used for respectively encoding $r_c$ qubits and $r_t$ qubits in the n qubits into a control register and a target register, and n being an integer greater than or equal to 2;
- acquiring at least two second unitary operators used for performing phase shifting on the n qubits;
- determining a third unitary operator used for replacing a qubit of the control register and a qubit of the target register with the $r_c$ qubits and the $r_t$ qubits;
- generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- combining the diagonal unitary matrix quantum circuits with a single-bit gate to obtain at least two uniform control gates; and
- combining the at least two uniform control gates into a quantum state preparation circuit.

In a fourth aspect, the present disclosure further provides an electronic device, which includes a memory and a processor. The memory stores a computer program that, when executed by the processor, implements the following steps:

- determining a first unitary operator corresponding to n qubits, the first unitary operator being used for respectively encoding $r_c$ qubits and $r_t$ qubits in the n qubits into a control register and a target register, and n being an integer greater than or equal to 2;
- acquiring at least two second unitary operators used for performing phase shifting on the n qubits;

- determining a third unitary operator used for replacing a qubit of the control register and a qubit of the target register with the $r_c$ qubits and the $r_t$ qubits;
- generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- combining the diagonal unitary matrix quantum circuits with a single-bit gate to obtain at least two uniform control gates; and
- combining the at least two uniform control gates into a quantum state preparation circuit.

In a fifth aspect, the present disclosure further provides a computer-readable storage medium, which stores a computer program that, when executed by a processor, implements the following steps:

- determining a first unitary operator corresponding to n qubits, the first unitary operator being used for respectively encoding $r_c$ qubits and $r_t$ qubits in the n qubits into a control register and a target register, and n being an integer greater than or equal to 2;
- acquiring at least two second unitary operators used for performing phase shifting on the n qubits;
- determining a third unitary operator used for replacing a qubit of the control register and a qubit of the target register with the $r_c$ qubits and the $r_t$ qubits;
- generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- combining the diagonal unitary matrix quantum circuits with a single-bit gate to obtain at least two uniform control gates; and
- combining the at least two uniform control gates into a quantum state preparation circuit.

In a sixth aspect, the present disclosure further provides a computer program product, which includes a computer program that, when executed by a processor, implements the following steps:

- determining a first unitary operator corresponding to n qubits, the first unitary operator being used for respectively encoding $r_c$ qubits and $r_t$ qubits in the n qubits into a control register and a target register, and n being an integer greater than or equal to 2;
- acquiring at least two second unitary operators used for performing phase shifting on the n qubits;
- determining a third unitary operator used for replacing a qubit of the control register and a qubit of the target register with the $r_c$ qubits and the $r_t$ qubits;
- generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits;
- combining the diagonal unitary matrix quantum circuits with a single-bit gate to obtain at least two uniform control gates; and
- combining the at least two uniform control gates into a quantum state preparation circuit.

The present disclosure describes a method for generating a quantum state preparation circuit. The method is performed by an electronic device, and the method includes determining a first unitary operator corresponding to n qubits, the first unitary operator for respectively encoding $r_c$ qubits and $r_t$ qubits in the n qubits into a control register and a target register, and n being an integer greater than or equal to 2; acquiring at least two second unitary operators for performing phase shifting on the n qubits; determining a third unitary operator for replacing a qubit of the control register and a qubit of the target register; generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits; combining the diagonal unitary matrix quantum circuits with a single-bit gate to obtain at least two uniform control gates; and combining the at least two uniform control gates into a quantum state preparation circuit.

The present disclosure describes an apparatus for generating a quantum state preparation circuit. The apparatus includes a memory storing instructions; and a processor in communication with the memory. When the processor executes the instructions, the processor is configured to cause the apparatus to perform determining a first unitary operator corresponding to n qubits, the first unitary operator for respectively encoding $r_c$ qubits and $r_t$ qubits in the n qubits into a control register and a target register, and n being an integer greater than or equal to 2; acquiring at least two second unitary operators for performing phase shifting on the n qubits; determining a third unitary operator for replacing a qubit of the control register and a qubit of the target register; generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits; combining the diagonal unitary matrix quantum circuits with a single-bit gate to obtain at least two uniform control gates; and combining the at least two uniform control gates into a quantum state preparation circuit.

The present disclosure describes a non-transitory computer-readable storage medium, storing computer-readable instructions. The computer-readable instructions, when executed by a processor, are configured to cause the processor to perform: determining a first unitary operator corresponding to n qubits, the first unitary operator for respectively encoding $r_c$ qubits and $r_t$ qubits in the n qubits into a control register and a target register, and n being an integer greater than or equal to 2; acquiring at least two second unitary operators for performing phase shifting on the n qubits; determining a third unitary operator for replacing a qubit of the control register and a qubit of the target register; generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits; combining the diagonal unitary matrix quantum circuits with a single-bit gate to obtain at least two uniform control gates; and combining the at least two uniform control gates into a quantum state preparation circuit.

Details of one or more embodiments of the present disclosure are provided in the following drawings and descriptions. Other features and advantages of the present disclosure will be apparent from the description, the drawings, and the claims.

under path restriction according to an embodiment.

Figure 9:
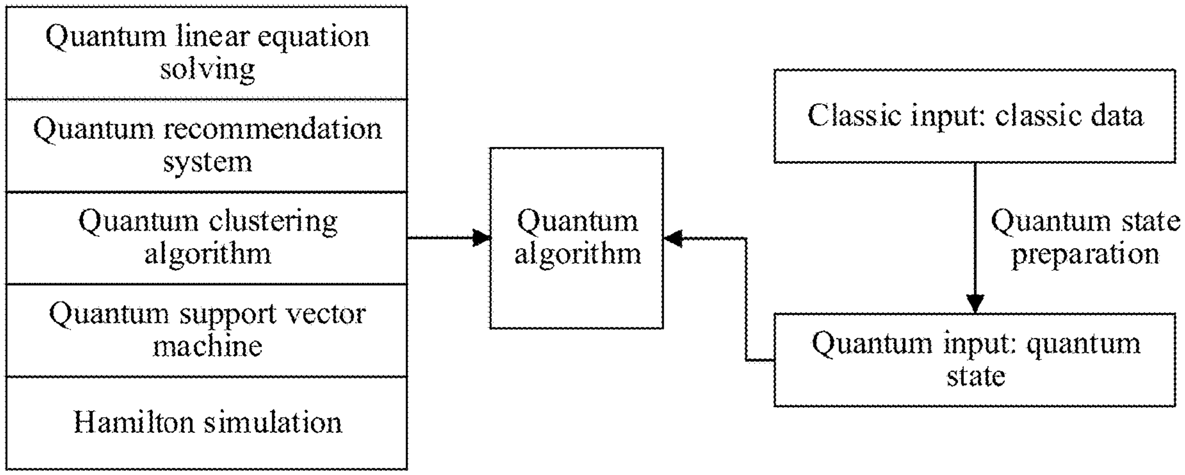

FIG. 9 is a schematic flowchart of quantum state preparation according to an embodiment.

Figure 10:
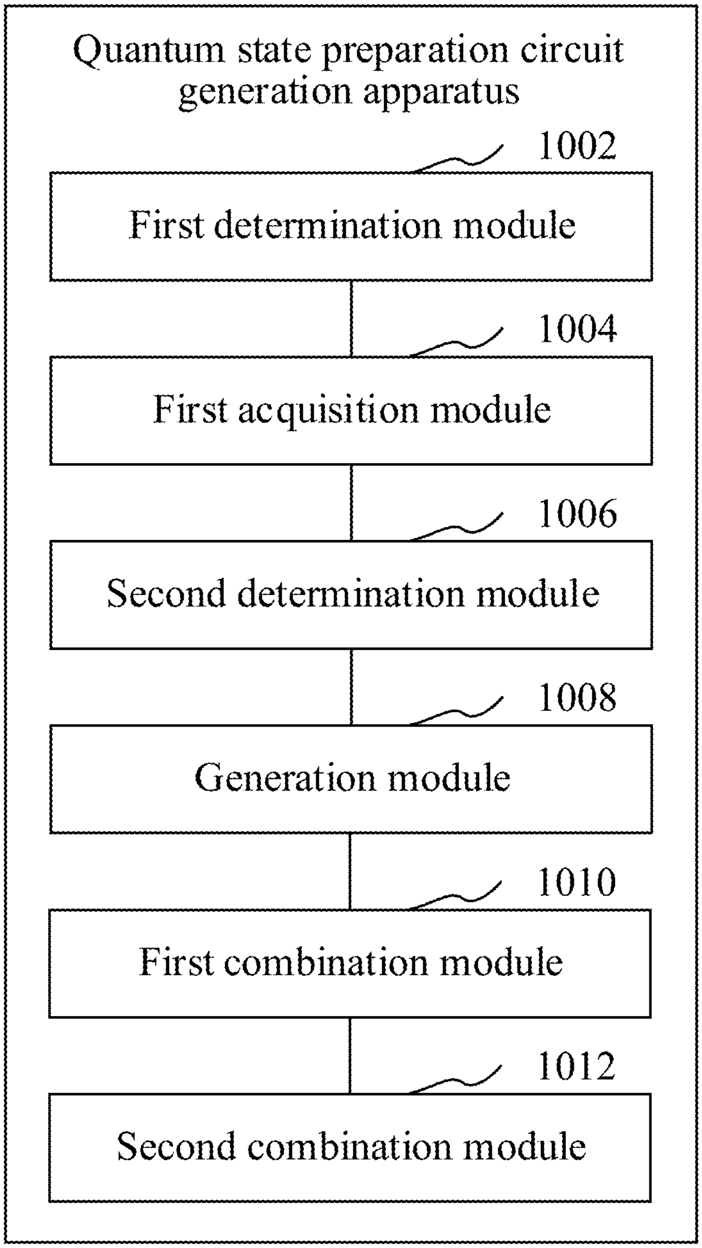

FIG. 10 is a structural block diagram of a quantum state preparation circuit generation apparatus according to an embodiment.

Figure 11:
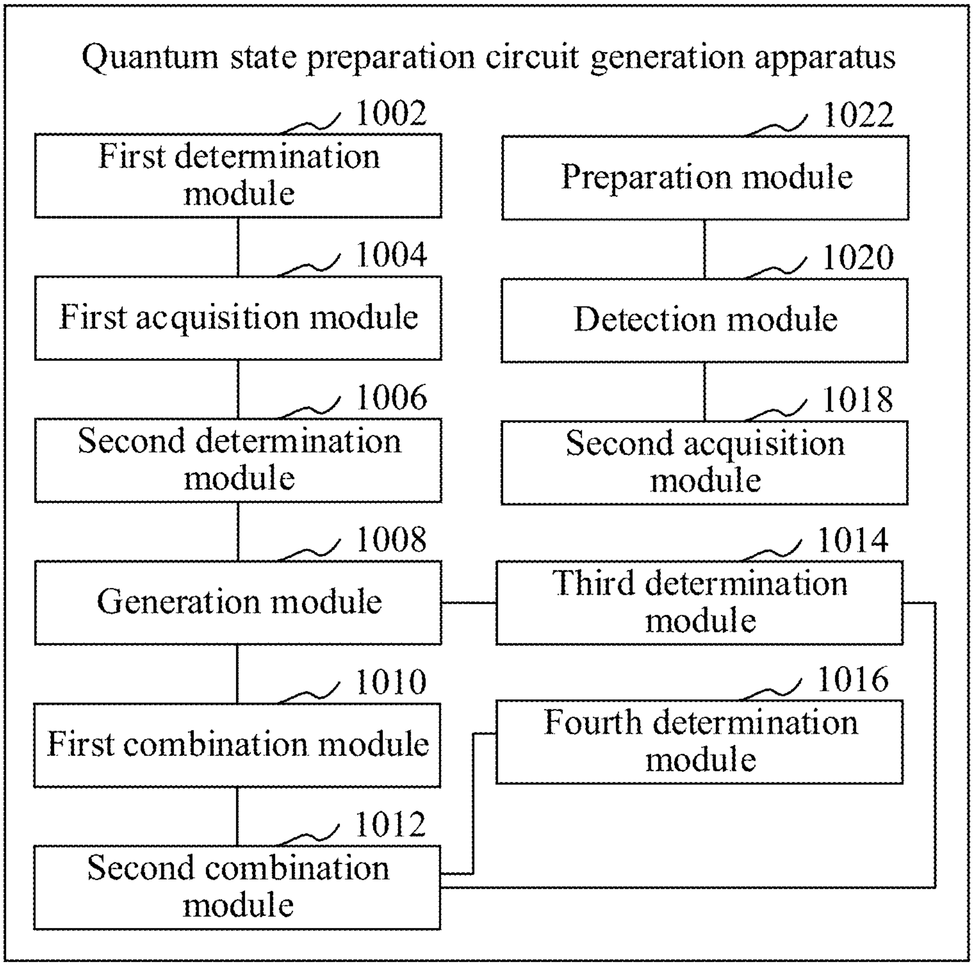

FIG. 11 is a structural block diagram of a quantum state preparation circuit generation apparatus according to another embodiment.

Figure 12:
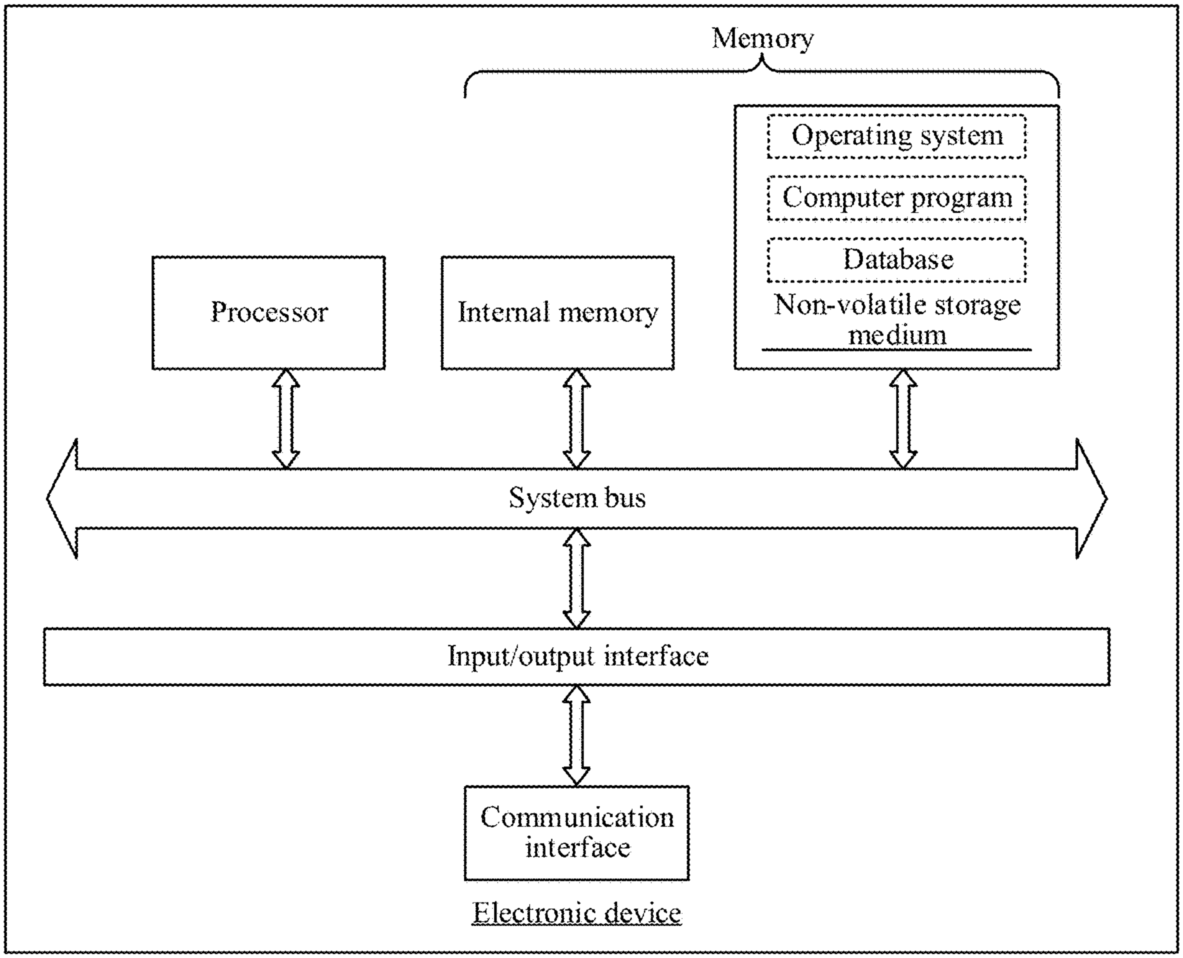

FIG. 12 is a schematic diagram of an inner structure of an electronic device according to an embodiment.

DESCRIPTION OF EMBODIMENTS

In order to make the objectives, the technical solutions, and the advantages of the present disclosure clearer, the present disclosure will be further described in detail below with reference to the drawings and the embodiments. It is to be understood that the specific embodiments described herein are only used for explaining the present disclosure, and are not used for limiting the present disclosure.

In the following description, the terms "first", "second", "third", "fourth", and "fifth" are only used to distinguish similar objects, and do not represent a specific ordering of objects. It will be appreciated that "first", "second", "third", "fourth", and "fifth" may be interchanged in specific order or sequence where permitted, so that the embodiments of the present disclosure described herein can be implemented in an order other than those illustrated or described herein.

Figure 1:
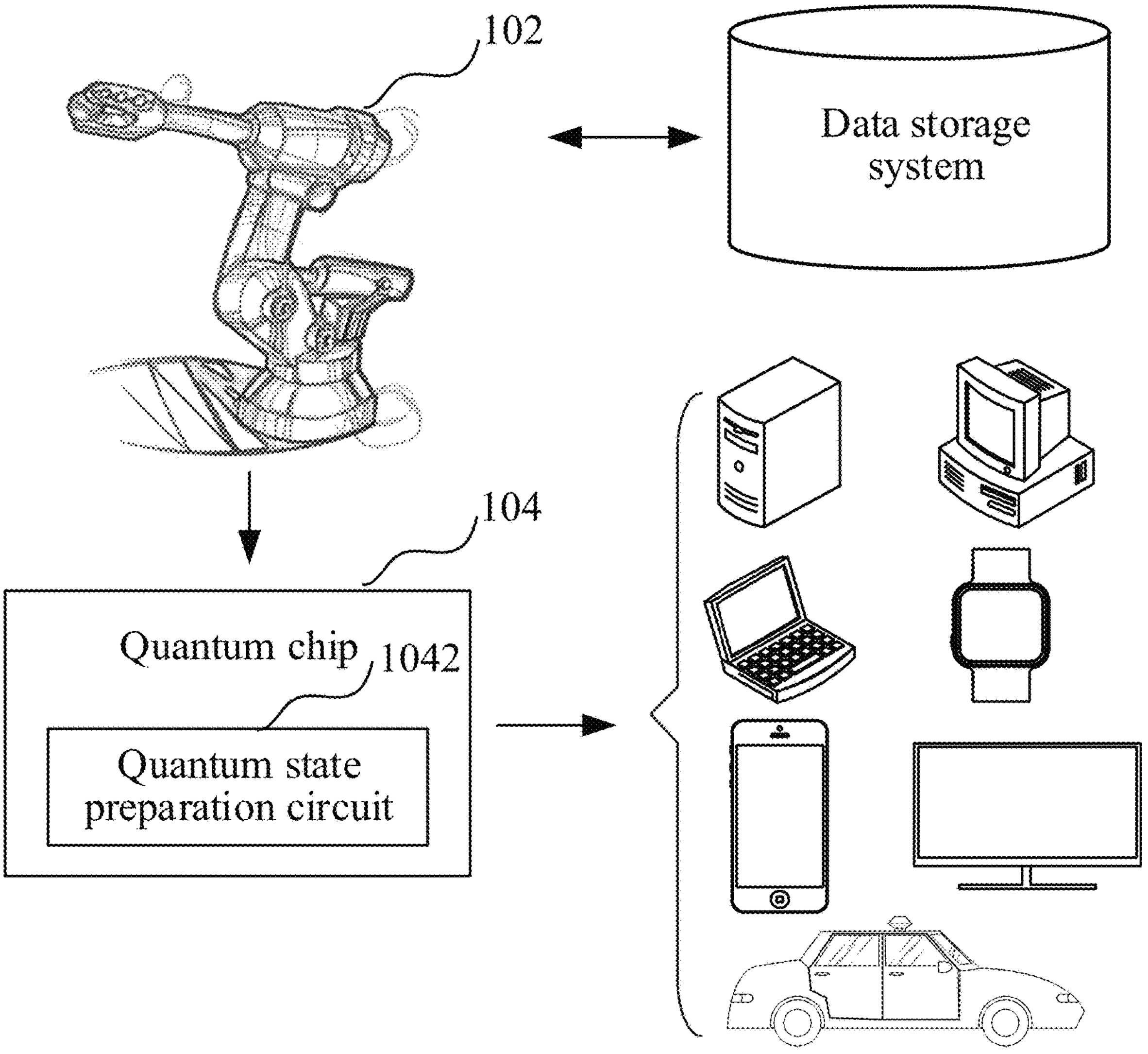
FIG. 1 is a diagram of an application environment of a quantum state preparation circuit generation method according to an embodiment.

A quantum state preparation circuit generation method according to the embodiments of the present disclosure may be applied to an application environment shown in FIG. 1. An electronic device 102 interacts with a quantum chip 104 through a sensor or a network. A data storage system may store data that needs to be processed by the electronic device 102. The data storage system may be integrated in the electronic device 102, or deployed on the cloud or other network servers. The electronic device 102 may be configured to generate a quantum state preparation circuit 1042, and the quantum chip 104 may be finally prepared from the quantum state preparation circuit 1042.

The electronic device 102 may be an industrial intelligent device configured to prepare the quantum state preparation circuit 1042, such as a lithography device, a machine arm, and other devices required by industrial production. After being prepared from the quantum state preparation circuit 1042, the quantum chip 104 may be integrated in various intelligent devices, which include: a smart phone, a tablet computer, a notebook computer, a desktop computer, a smart speaker, a smart watch, an Internet of Things device, and a portable wearable device. The Internet of Things device may be a smart speaker, a smart television, a smart air condition, a smart on-board device, or the like. The portable wearable device may be a smart watch, a smart bracelet, a headset, or the like.

Before the embodiments of the present disclosure are further described in detail, nouns, terms, symbols, parameter, and a basic quantum gate that are involved in the embodiments of the present disclosure are described. The nouns and the terms involved in the embodiments of the present disclosure are applicable to the following explanations.

(1) Quantum computation (or quantum computing): a computing method that uses the properties of superposition and entanglement of quantum states to quickly complete computing tasks.

(2) Qubit: a carrying form of quantum information.

(3) Quantum circuit: a quantum computation model that is composed of a series of quantum gate sequences and uses quantum gates to complete computation.

(4) Superconducting quantum chip: a central processing unit of a quantum computer. The quantum computer is a machine that uses the superposition principle of quantum mechanics and quantum entanglement to perform computation, has strong parallel processing capabilities, and may solve some problems that are difficult for classical computers to compute.

(5) i-Gray code cycle: a sequence (n bit string sequence for short) of all n-bit strings in $\{0,1\}^n$, which satisfies the condition that there is one different bit between two adjacent bit strings and there is one different bit between the first and last bit strings. For any $$i \in [n], c_1^i, c_2^i, \ldots, c_{2^n-1}^i, c_{2^n}^i$$

represents the n bit string sequence, and for any $$i \in [n], c_1^i = 0^{r_c}.$$

For any $j \in \{2, 3, \ldots, 2^n\}$, $h_{ij}$ represents a subscript of a different bit between $$c_{j-1}^i \text{ and } c_j^i, h_{i1}$$

represents a subscript of a different bit between $$c_1^i \text{ and } c_{2^n}^i,$$

and:

$$h_{ij}=\begin{cases} r_c & \text{if } i=j=1 \\ i-1 & \text{if } i\in\{2,3,\ldots,n\} \text{ and } j=1 \\ \max\{k: 2^k \mid 2(j-1)\} & \text{if } i=1 \text{ and } j\in\{2,3,\ldots,2^n\} \\ h_{1j}+i-1 & \text{if } h_{1j}+i-1\le n \text{ and } j\in\{2,3,\ldots,2^n\} \\ h_{1j}+i-1-r_c & \text{if } h_{1j}+i-1> n \text{ and } j\in\{2,3,\ldots,2^n\} \end{cases}. \quad (1)$$

The foregoing constructed bit string sequence $$c_1^i, c_2^i, \ldots, C_{2^n-1}^i, c_{2^n}^i$$

is referred to as a (i, n)-Gray code cycle, and is called the i-Gray code cycle for short in the present disclosure. It is to be pointed out that in the subsequent embodiments, unless otherwise described, a Gray code cycle is also referred to as the i-Gray code cycle.

Figure 2:
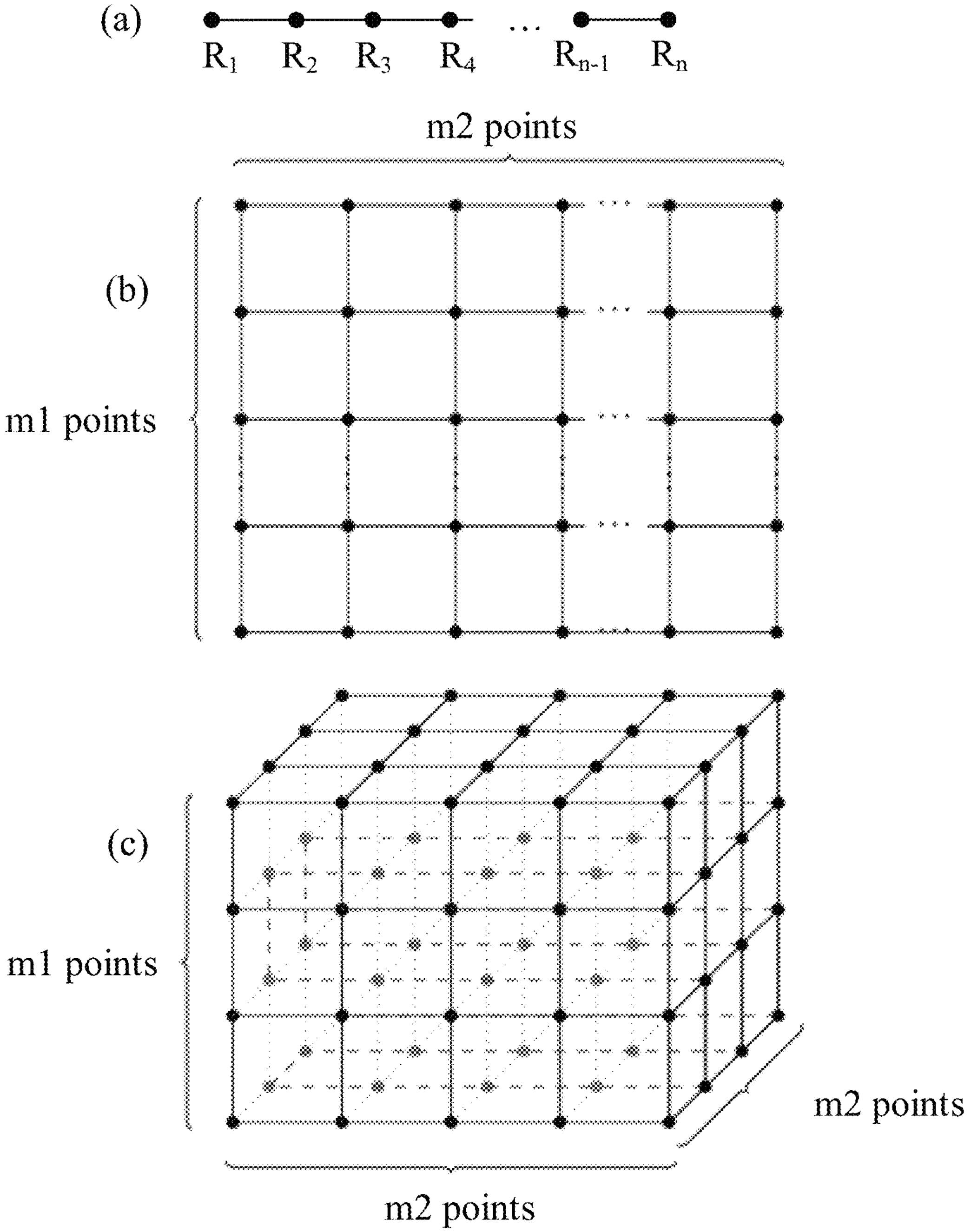
FIG. 2 is a schematic diagram of an n-path restriction of a quantum circuit according to an embodiment.

(6) n-path restriction (path restriction for short): if in a n-quantum circuit, a double-bit gate (CNOT) is only allowed to act on two adjacent qubits, it is called that the n-quantum circuit is under n-path restriction. As shown in FIG. 2(*a*), FIG. 2(*a*) shows the n-path restriction of the n-qubit circuit, and vertices $R_1, R_2, \ldots, R_n$ respectively represent n qubits. If two qubits are connected through an edge, the double-bit gate may act on the two qubits.

(7) d-dimensional grid restriction (that is, multi-dimensional grid restriction): if in an n-quantum circuit arranged in a d-dimensional grid, a double-bit gate is only allowed to act on two adjacent qubits, it is called that the quantum circuit arranged in the d-dimensional grid is under d-dimensional grid restriction. As shown in FIG. 2(*b*), in a quantum circuit arranged in a 2-dimensional grid, points on the 2-dimensional grid represent qubits, and there are m1×m2=n qubits in total. If two qubits are connected through an edge, the double-bit gate may act on the two qubits. As shown in FIG. 2(*c*), in a quantum circuit arranged in a 3-dimensional grid, points on the 3-dimensional grid represent qubits, and there are m1×m2×m3=n qubits in total. If two qubits are connected through an edge, the double-bit gate may act on the two qubits.

(8) Basic symbols involved in the present disclosure: [n] represents a set {1, 2, . . . , n}. $\mathbb{F}_2$ represents a binary field (belonging to a finite field). For any $x=(x_1, \ldots, x_n)^T$, $y=(y_1, \ldots, y_n)^T \in \{0,1\}^n$, $x \oplus y=(x_1 \oplus y_1, \ldots, x_n \oplus y_n)^T$, an inner product $$\langle x, y\rangle = \bigoplus_{i=1}^{n} x_i y_i,$$

and both the addition and multiplication are defined over the binary field. $0^n$ and $1^n$ respectively represent vectors with a length of n and all elements of 0 and 1. $e_i$ represents a vector whose ith element is 1 and other elements are 0. For any positive integer set S, $|\psi\rangle_S$ represents a quantum state $|\psi\rangle$ composed of qubits in the set S.

(9) Basic quantum gates involved in the present disclosure are specifically shown Table 1.

TABLE 1

| Name | Symbol | Definition | Parameter |
|---|---|---|---|
| Rotation gate R(θ) | R(θ) | $\begin{bmatrix}1 & \\ & e^{i\theta}\end{bmatrix}$ | $\theta \in \mathbb{R}$ |
| Hadamard gate H | H | $\frac{1}{\sqrt{2}}\begin{bmatrix}1 & 1\\ 1 & -1\end{bmatrix}$ | None |
| Phase gate S | S | $\begin{bmatrix}1 & \\ & i\end{bmatrix}$ | None |
| CNOT gate $CNOT_j^i$ | | $\begin{bmatrix}1 & & & \\ & 1 & & \\ & & & 1\\ & & 1 & \end{bmatrix}$ | Control bit reference sign i Target bit reference sign j |
| Uniform control gate $V_n$ of n-qubit | $V_n$ | $\begin{bmatrix}U_1 & & & \\ & U_2 & & \\ & & \ddots & \\ & & & U_{2^n-1}\end{bmatrix}$ | $\forall k \in [2^{n-1}]$ and $U_k \in \mathbb{C}^{2\times 2}$ are unitary matrices |
| Diagonal unitary matrix $\Lambda_n$ of n-qubit | $\Lambda_n$ | $\begin{bmatrix}1 & & & \\ & e^{i\theta_1} & & \\ & & \ddots & \\ & & & e^{i\theta_{2^n-1}}\end{bmatrix}$ | $\theta_1, \theta_2, \ldots, \theta_{2^n-1} \in \mathbb{R}$ |

(10) Basic quantum gate parameters involved in the present disclosure are specifically as follows:

$$\tau = \lceil 2 \log n \rceil$$

$$r_t = (n-\tau)/2$$

$$r_c = (n+\tau)/2$$

$$\ell = 4\lceil 2^{r_t}/(r_t+1)\rceil - 1$$

where, ⌈ ⌉ represents upward rounding.

(11) The problem of quantum state preparation under path restriction is defined as follows: any complex vector $v=(v_0, v_1, \ldots, v_{2^n-1}) \in \mathbb{C}^{2^n}$ satisfying $\|v\|_2=1$ is given, an initial state $|0\rangle^{\oplus n}$ is given, and a quantum state of n bits is prepared:

$$|\psi_v\rangle = \sum_{k=0}^{2^n-1} v_k |k\rangle$$

where, $\{|k\rangle : k=0,1, \ldots, 2^n-1\}$ is a group of computing bases in a quantum system. In the design of a quantum state preparation circuit, any single-bit quantum gate and double-bit gate are only allowed, and the double-bit gate is only allowed to act on two adjacent bits.

Figure 6:
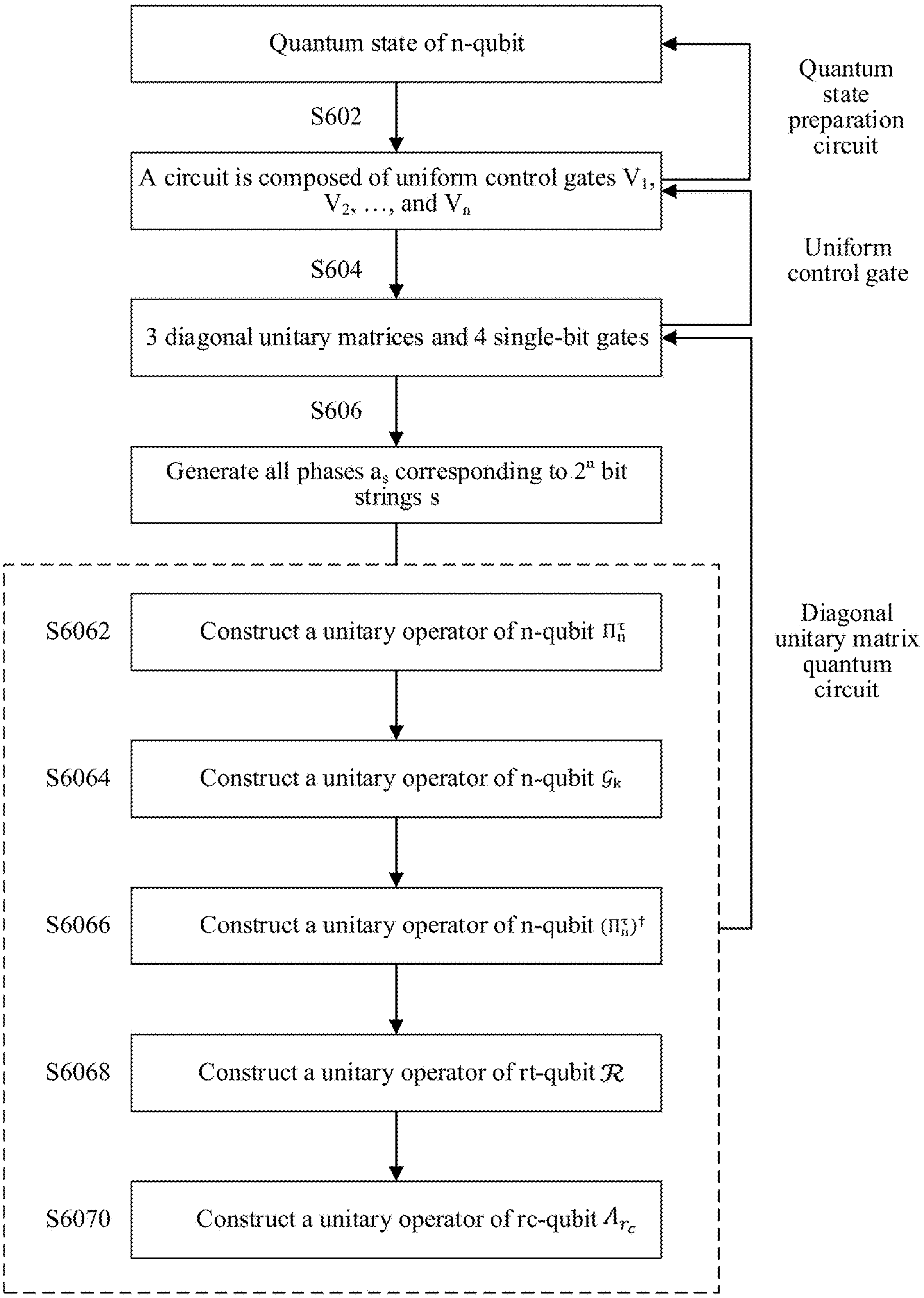
FIG. 6 is a diagram of a quantum circuit framework of a diagonal matrix under path restriction according to an embodiment.

In order to have a clearer and more intuitive understanding of the present disclosure, the design process of a quantum state preparation circuit under n-path restriction is described here with reference to one embodiment. As shown in FIG. 6, the process specifically includes the following steps.

S602: Decompose a quantum state preparation circuit into uniform control gates according to a target quantum state.

Figure 3:
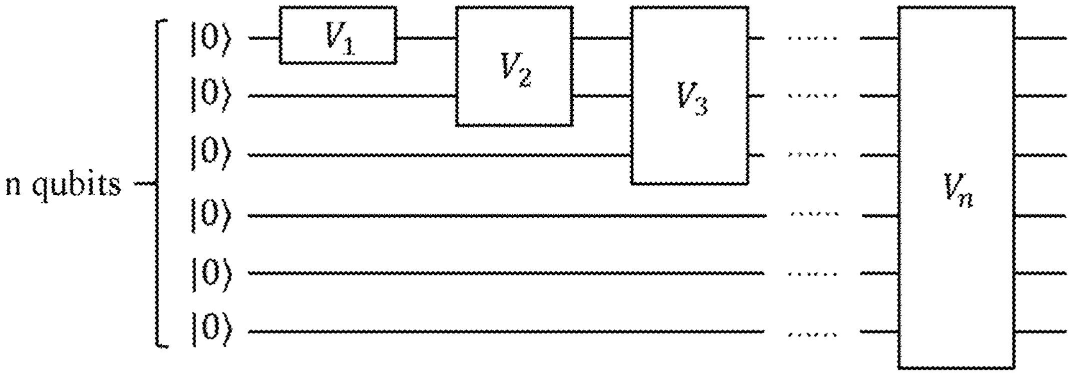
FIG. 3 is a schematic diagram of a quantum state preparation circuit framework of n qubits according to an embodiment.

There are n uniform control gates obtained by decomposition, which are respectively $V_1, V_2, \ldots, V_n$, as shown in FIG. 3.

S604: Further decompose each uniform control gate to obtain a diagonal unitary matrix and a single-bit gate.

Figure 4:
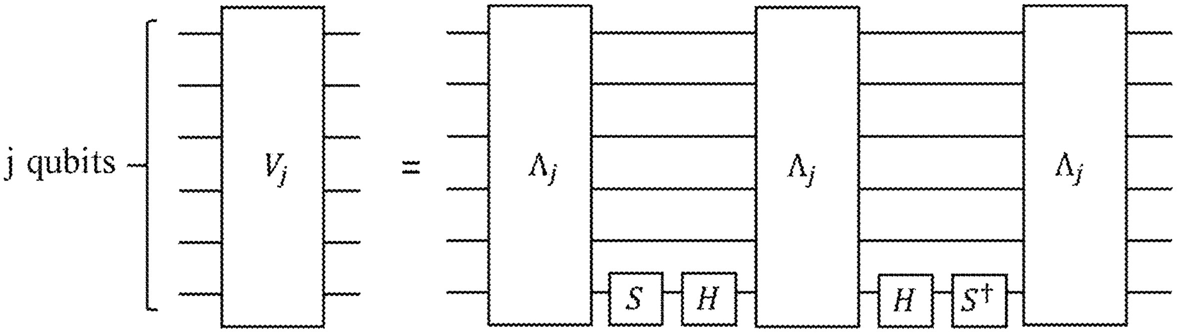
FIG. 4 is a schematic structural diagram of a uniform control gate of n qubits according to an embodiment.

Each uniform control gate may be decomposed into 3 diagonal unitary matrices and 4 single-qubit gates, as shown in FIG. 4.

The quantum state preparation circuit is decomposed into a series of diagonal unitary matrices $\Lambda_j$ ($j\in[n]$) and single-bit gates (that is, single-qubit gates) through steps S602 and S604. Therefore, any diagonal unitary matrix quantum circuit may be implemented under path restriction to directly obtain a quantum state preparation circuit under path restriction.

S606: Construct a diagonal unitary matrix quantum circuit under path restriction.

A quantum circuit of the diagonal unitary matrix is implemented under path restriction by a combination technique and a recursion method. The quantum circuit is a circuit with an optimal depth in the asymptotic sense.

It can be seen from Table 1 that the diagonal unitary matrix $\Lambda_n$ is used for performing the following transformation on each vector $|x\rangle$ in the computing base:

$$|x\rangle e^{i\theta(x)}|x\rangle,\ \forall x\in\{0,1\}^n-\{0^n\},\ \theta(x)\in\mathbb{R},\ \theta(0^n)=1$$

There is $\{\alpha_s: s\in\{0,1\}^n-\{0^n\}\}$ satisfying:

$$\sum_s\langle s,x\rangle\alpha_s=\theta(x),\ \forall x\in\{0,1\}^n-\{0^n\} \tag{2.}$$

During construction of the diagonal unitary matrix quantum circuit under path restriction, the real number set $\{\alpha_s: s\in\{0,1\}^n-\{0^n\}\}$ is used.

Therefore, S606 includes the following 5 specific sub-steps.

S6062: Construct a unitary operator $$\prod\nolimits_n^\tau$$

of n-qubit.

S6064: Construct a unitary operator $\mathcal{G}_x, \mathcal{G}_2, \ldots, \mathcal{G}_\ell$ of n-qubit.

S6066: Construct a unitary operator $$\left(\prod\nolimits_n^\tau\right)^\dagger$$

of n-qubit.

S6068: Construct a unitary operator $\mathcal{R}$ of $r_t$-qubit.

S6070: Construct a diagonal unitary operator $\Lambda_{r_c}$ of $r_c$-qubit.

Then the diagonal unitary matrix $\Lambda_n$ is obtained according to the foregoing unitary operators $$\prod\nolimits_n^\tau,$$

$$\mathcal{G}_1, \mathcal{G}_2, \ldots, \mathcal{G}_\ell,$$

$$\left(\prod\nolimits_n^\tau\right)^\dagger,$$

Figure 5:
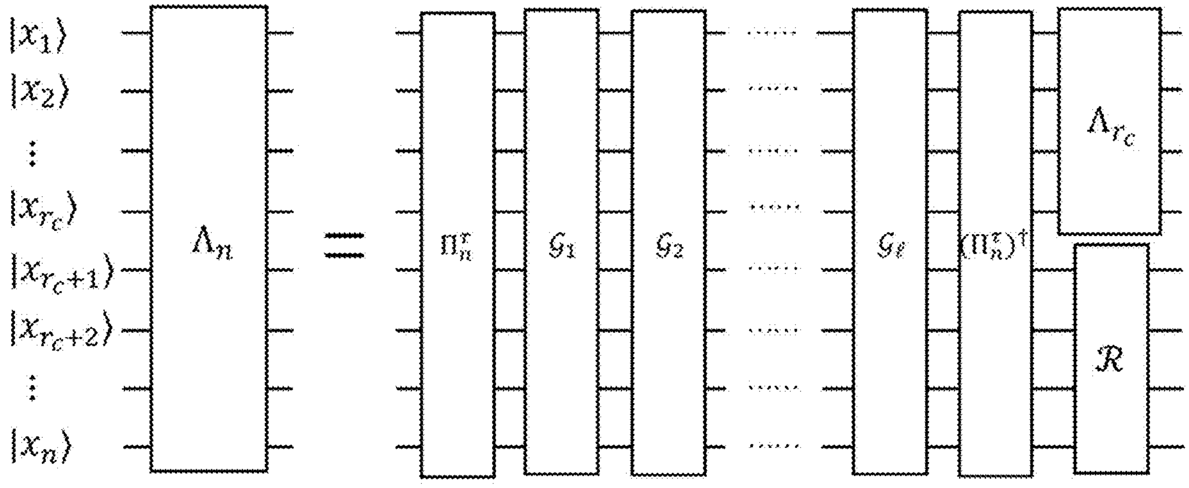
FIG. 5 is a schematic diagram of a first unitary operator, a second unitary operator, a third unitary operator, a fourth unitary operator, and a diagonal unitary matrix operator that are obtained by decomposing a diagonal unitary matrix according to an embodiment.

$\mathcal{R}$, and $\Lambda_{r_c}$, as shown in FIG. 5. In this way, the diagonal unitary matrix quantum circuit is constructed. The diagonal unitary matrix quantum circuit and the single-bit gate are combined into a uniform control gate, and uniform control gates are combined into a quantum state preparation circuit.

Figure 7:
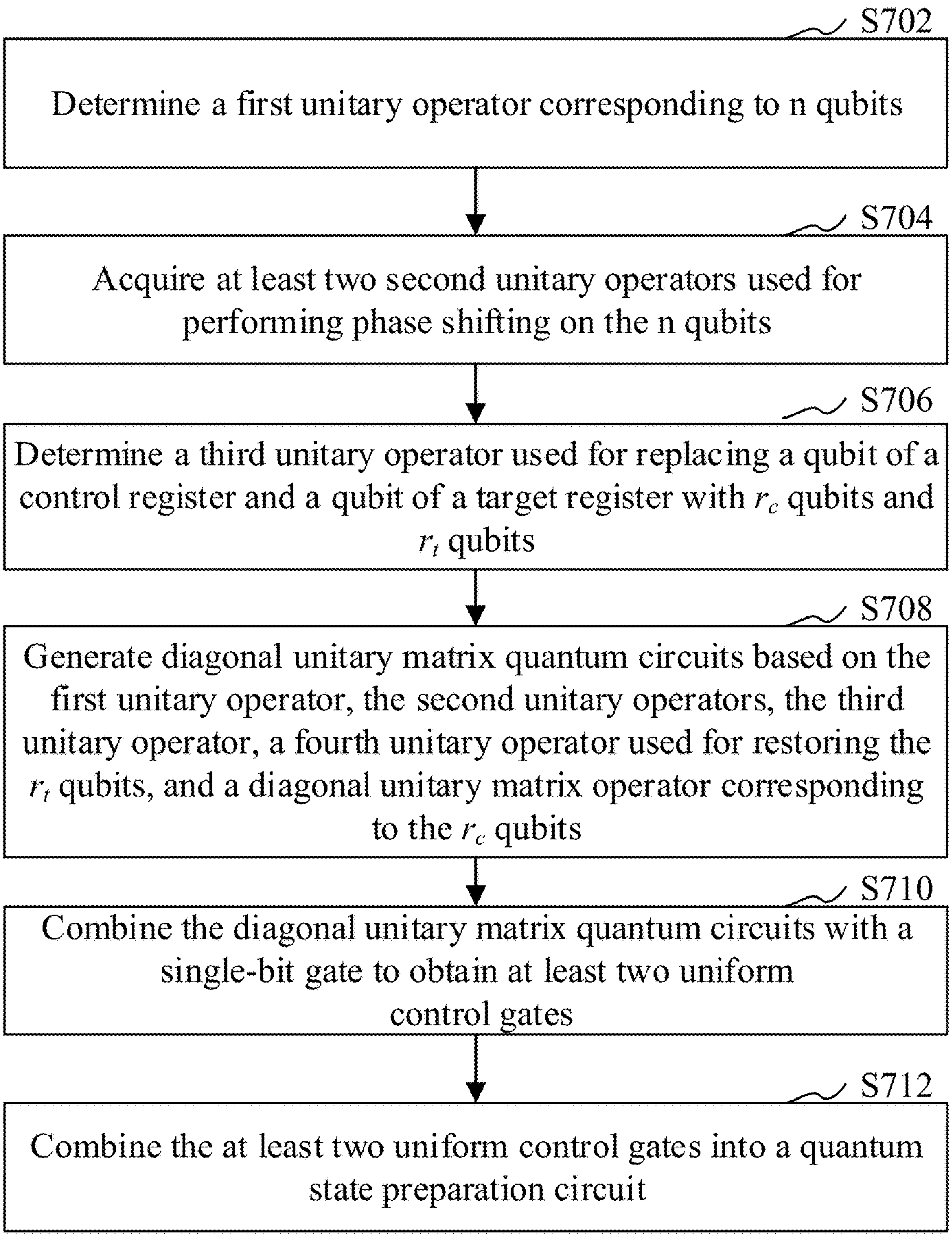
FIG. 7 is a schematic flowchart of a quantum state preparation circuit generation method according to an embodiment.

In an embodiment, as shown in FIG. 7, a quantum state preparation circuit generation method is provided. The following description is made by taking a case where the method is applied to an electronic device, and the method includes the following steps.

S702: Determine a first unitary operator of n qubits.

The first unitary operator $$\left(\prod\nolimits_n^\tau\right)$$

is used for respectively encoding $r_c$ qubits and $r_t$ qubits in the n qubits into a control register and a target register; and n is an integer greater than or equal to 2. The first $r_c$ qubits may be replaced to the control register and the last $r_t$ qubits may be replaced to the target register through the first unitary operator $$\prod\nolimits_n^\tau,$$

that is, $$\begin{aligned}\Pi_n^\tau|x\rangle &\triangleq \Pi_n^\tau|x_{control}\rangle_{\{1,2,\ldots,r_c\}}|x_{target}\rangle_{\{r_c+1,r_c+2,\ldots,n\}}\\ &=|x_{control}\rangle_C|x_{target}\rangle_T.\end{aligned} \tag{3}$$

The first unitary operator $$\Pi_n^\tau$$

is an invertible linear transformation on a computing base, the invertible linear transformation is implemented in a circuit under path restriction or multi-dimensional grid restriction, and a circuit depth of the first unitary operator $$\prod\nolimits_n^\tau$$

may be obtained. Therefore, under path restriction or multi-dimensional grid restriction, the first unitary operator may be implemented by a double-bit gate with a circuit depth of $O(n^2)$. The path restriction represents that the double-bit gate acts on two adjacent qubits in the n qubits.

Figure 8:
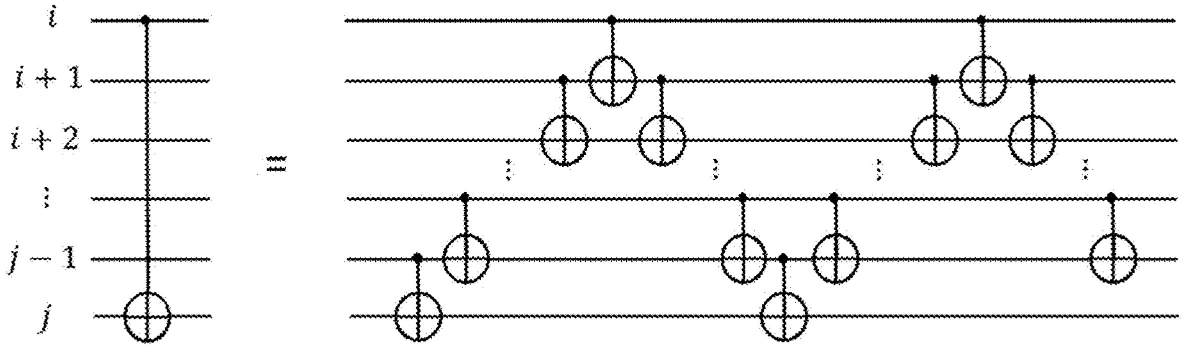
FIG. 8 is a schematic diagram of an implementation of a CNOT gate $$CNOT_j^i$$

For the double-bit gate $$CNOT_j^i,\ CNOT_j^i$$

represents that a control bit of the double-bit gate is on an $i^{th}$ qubit of the control register, and a target bit is on a $j^{th}$ qubit of the target register. Under path restriction, the double-bit gate $$CNOT_j^i$$

may be implemented by a double-bit circuit with both a circuit depth and size of O(|i−j|), as shown in FIG. 8.

S704: Acquire at least two second unitary operators used for performing phase shifting on the n qubits.

The second unitary operator ($\mathcal{G}_1, \ldots, \mathcal{G}_\ell$) is a unitary operator used for performing phase shifting on the n qubits.

In an embodiment, the electronic device may first construct the at least two second unitary operators used for performing phase shifting on the n qubits and then store the at least two second unitary operators; and acquire the at least two second unitary operators when a quantum state preparation circuit needs to be generated.

Before the second unitary operators are constructed, the content related to the second unitary operators is described. First, $$\ell \le 4\left\lceil \frac{2^{r_t}}{r_t+1} \right\rceil - 1$$

sets $T^{(1)}, T^{(2)}, \ldots, T^{(\ell)}$ satisfying two properties are defined, and the two properties are specifically as follows:

(1) for each $k \in [\ell]$, a set $$T^{(k)} = \{t_1^{(k)}, t_2^{(k)}, \ldots, t_{r_t}^{(k)}\} \subseteq \{0, 1\}^{r_t}$$

is linearly independent in a finite field $\mathbb{F}_2$; and (2) the sets $T^{(1)}, T^{(2)}, \ldots, T^{(\ell)}$ can cover a set $\{0,1\}^{r_t} - \{0^{r_t}\}$, that is, $\cup_{k \in [\ell]} T^{(k)} = \{0,1\}^{r_t} - \{0^{r_t}\}$.

For each $k \in [\ell] \cup \{0\}$, a quantum state of the $r_t$ bits on the target register T is defined:

$$|y^{(k)}\rangle_T = |y_1^{(k)} y_2^{(k)} \ldots y_{r_t}^{(k)}\rangle_T, \text{ where, } y_j^{(k)} = \begin{cases} x_{r_c+j} & \text{if } k = 0 \\ \langle 0^{r_c} t_j^{(k)}, x\rangle & \text{if } k \in [\ell] \end{cases}. \tag{4}$$

That is, $y^{(0)}$ is the same as $x_{target}$, and $$y_j^{(k)}$$

is a linear function related to $$0^{r_c} t_j^{(k)}.$$

Disjoint sets $F_1, F_2, \ldots, F_\ell$ are defined below:

$$\begin{cases} F_1 = \{ct : t \in T^{(1)}, c \in \{0, 1\}^{r_c}\}, \\ F_k = \{ct : t \in T^{(k)}, c \in \{0, 1\}^{r_c}\} - \bigcup_{d \in [k-1]} F_d, k \in S\{2, 3, \ldots, \ell\} \end{cases}. \tag{5}$$

For any $i \neq j \in [\ell]$, the sets $F_1, F_2, \ldots, F_\ell$ satisfy $F_1 \cap F_j = \emptyset$ and:

$$\bigcup_{k \in [\ell]} F_k = \{0, 1\}^{r_c} \times \bigcup_{k \in [\ell]} T^{(k)} = \{0, 1\}^{r_c} \times (\{0, 1\}^{r_t} - \{0^{r_t}\}) = \{0, 1\}^n - \{c0^{r_t} : c \in \{0, 1\}^{r_c}\}. \tag{6}$$

The second unitary operator $\mathcal{G}_k$ is defined below: for any $k \in [\ell]$, $$\mathcal{G}_k |x_{cotrol}\rangle_C |y^{(k-1)}\rangle_T = e^{i\sum_{s \in F_k} \langle s, x\rangle \alpha_s} |x_{control}\rangle_C |y^{(k)}\rangle_T \tag{7.}$$

It can be concluded from the foregoing formula that the second unitary operator $\mathcal{G}_k$ has two functions: introduction of a phase, and transition from a $(k-1)^{th}$ step to a $k^{th}$ step.

In an embodiment, after determining the second unitary operators, the electronic device may further construct a unitary matrix quantum circuit under path restriction according to the second unitary operators, and construct a diagonal unitary matrix quantum circuit according to the unitary matrix quantum circuit and unitary matrix quantum circuits corresponding to other unitary operators.

The construction of the unitary matrix quantum circuit corresponding to the second unitary operator may include two phases: a generation phase and a Gray code cycle phase. In the generation phase, a circuit corresponding to a generation unitary operator is mainly constructed, and the generation unitary operator is used for transforming, on the $r_t$ qubits, the computing base into an invertible linear transformation in the finite field. In the Gray code cycle phase, a circuit of a Gray code cycle operator is mainly constructed, and the Gray code cycle operator is used for performing phase shifting on a quantum state of the n qubits through a Gray code cycle corresponding to the $r_c$ qubits.

(1) Generation Phase

In the generation phase, the generation unitary operator $$U_{Gen}^{(k)}$$

is enabled to satisfy:

$$|y^{(k-1)}\rangle_T \xrightarrow{U_{Gen}^{(k)}} |y^{(k-1)}\rangle_T, k \in [\ell]. \tag{8}$$

where, $y^{(k-1)}$ and $y^{(k)}$ are respectively determined according to sets $T^{(k-1)}$ and $T^{(k)}$, and for $k \in [\ell] \cup \{0\}$, $$T^{(k)} = \{t_1^{(k)}, t_2^{(k)}, \ldots, t_{r_t}^{(k)}\}.$$

A sequence of elements in the set is fixed, and for any $k \in [\ell]$, a matrix $$\hat{T}^{(k)} = [t_1^{(k)}, t_2^{(k)}, \ldots, t_{r_t}^{(k)}]^T \in \{0, 1\}^{r_t \times r_t}$$

is defined. When k=0, $\hat{T}^{(0)} = I \in \{0,1\}^{r_t \times r_t}$. Therefore, the vector $y^{(k)}$ may be written as:

$$y^{(k)} = \hat{T}^{(k)} x_{target} \tag{9.}$$

Because $$t_1^{(k)}, t_2^{(k)}, \ldots, t_{r_t}^{(k)}$$

are linearly independent in the finite field $\mathbb{F}_2$, $\hat{T}^{(k)}$ is invertible in the finite field $\mathbb{F}_2$, and the generation unitary operator is defined:

$$U_{Gen}^{(k)}|y\rangle = \left|\hat{T}^{(k)}\left(\hat{T}^{(k-1)}\right)^{-1} y\right\rangle$$

where, multiplication of matrix vectors on the right side of the foregoing equation is defined in the finite field $\mathbb{F}_2$, and it can be concluded with reference to equation (9) that:

$$U_{Gen}^{(k)}\left|y^{(k-1)}\right\rangle_T = \left|\hat{T}^{(k)}\left(\hat{T}^{(k-1)}\right)^{-1} y^{(k-1)}\right\rangle_T = \left|\hat{T}^{(k)} x_{target}\right\rangle_T = \left|y^{(k)}\right\rangle_T$$

It can be seen from the foregoing content that the computing base may be transformed into an invertible linear transformation in the finite $\mathbb{F}_2$ through the generation unitary operator $$U_{Gen}^{(k)}.$$

Therefore, under path restriction, the generation unitary operator $$U_{Gen}^{(k)}$$

may be implemented by a double-bit gate circuit with a depth of $O(n^2)$. The path restriction represents that the double-bit gate acts on two adjacent qubits in the n qubits.

(2) Gray Code Cycle Phase

In the Gray code cycle phase, the Gray code cycle operator $U_{GrayCycle}$ is enabled to satisfy:

$$|x_{control}\rangle_C|y^{(k)}\rangle_T \xrightarrow{U_{GrayCycle}} e^{i\sum_{s\in F_k}\langle s,x\rangle\alpha_s}|x_{control}\rangle_C|y^{(k)}\rangle_T. \quad (10)$$

where, $k\in[\ell]$, and $F_k$ is defined in equation (4). For any $i\in[r_t]$, $$c_1^i, c_2^i, \ldots, c_{2^{r_c}-1}^i, c_{2^{r_c}}^i$$

represent an i-Gray code cycle of $r_c$ bits, and for any $i\in[r_t]$, $$c_1^i = 0^{r_c}.$$

For any $j\in\{2, 3, \ldots, 2^{r_c}\}$, $h_{ij}$ represents a subscript of a different bit between $$c_{j-1}^i \text{ and } c_j^i,$$

and $h_{i1}$ represents a subscript of a different bit between $$c_1^i \text{ and } c_{2^{r_c}}^i.$$

For the i-Gray code cycle of $r_c$ bits, $h_{ij}$ is defined as below:

$$h_{ij} = \begin{cases} r_c & \text{if } i=j=1 \\ i-1 & \text{if } i\in\{2,3,\ldots,r_t\} \text{ and } j=1 \\ \max\{k: 2^k | 2(j-1)\} & \text{if } i=1 \text{ and } j\in\{2,3,\ldots,2^{r_c}\} \\ h_{1j}+i-1 & \text{if } h_{1j}+i-1\le r_c \text{ and } j\in\{2,3,\ldots,2^{r_c}\} \\ h_{1j}+i-1-r_c & \text{if } h_{1j}+i-1>r_c \text{ and } j\in\{2,3,\ldots,2^{r_c}\} \end{cases}. \quad (11)$$

It can be seen from the definition of $h_{ij}$ that $h_{1j}=k$ appears at most $O(2^{r_c-k})$ times.

It is to be pointed out that the Gray code cycle phase includes $2^{r_c}+1$ phases.

1) Phase 1: phase 1 in the $2^{r_c}+1$ phases is implemented by a first rotation gate circuit acting on an $i^{th}$ qubit of the target register. For example, for any $i\in[r_t]$, if a bit string $$0^{r_c}t_i^{(k)} \in F_k,$$

a rotation gate $$R\left(\alpha_{0^{r_c}t_i^{(k)}}\right)$$

of a circuit $C_1$ acts on the $i^{th}$ bit of the target register.

2) Phase $p\in\{2,3, \ldots, 2^{r_c}\}$ includes two steps.

In step p.1, phase p in the $2^{r_c}+1$ phases is implemented by a first double-bit gate circuit, and a control bit of a double-bit gate in the first double-bit gate circuit is on an $h_{ip}^{th}$ qubit of the control register, and a target bit is on the $i^{th}$ qubit of the target register. For example, for each $i\in[r_t]$, the control bit of the double-bit gate in the first double-bit gate circuit is on the $h_{ip}^{th}$ qubit of the control register, and the target bit is on the $i^{th}$ qubit of the target register T. That is, for each $i\in[r_t]$, if $h_{ip}\le r_t$, a double-bit gate $$CNOT_{2i}^{2h_{ip}-1}$$

is enabled to work; and if $h_{ip}>r_t$, a double-bit gate $$CNOT_{2i}^{h_{ip}+r_t}$$

is enabled to work.

In step p.2, phase p in the $2^{r_c}+1$ phases is implemented by a second rotation gate circuit acting on the $i^{th}$ qubit of the target register. For example, for each $i\in[r_t]$, if $$c_p^i t_i^{(k)} \in F_k,$$

a rotation gate $$R\left(\alpha_{c_p^i t_i^{(k)}}\right)$$

acts on the $i^{th}$ qubit (with a reference sign of 2i) of the target register.

3) Phase $2^{r_c}+1$: phase $2^{r_c}+1$ in the $2^{r_c}+1$ phases is implemented by a second double-bit gate circuit, and a control bit of a double-bit gate in the second double-bit gate circuit is on an $h_{i1}{}^{t}$ qubit of the control register, and a target bit is on the $i^{th}$ qubit of the target register. For example, for each $i \in [r_t]$, the control bit of the double-bit gate in the second double-bit gate circuit is on the $h_{i1}{}^{th}$ qubit of the control register, and the target bit is on the $i^{th}$ qubit of the target register. That is, for each $i \in [r_t]$, if $h_{i1} \le r_t$, a double-bit gate $$CNOT_{2i}^{2h_{i1}-1}$$

is enabled to work; and if $h_{i1} > r_t$, a double-bit gate is $$CNOT_{2i}^{h_{i1}+r_t}$$

is enabled to work.

Therefore, in the Gray code cycle phase, the Gray code cycle operator may be implemented by a circuit with a circuit depth of $O(2^{r_c})$.

Here, the accuracy of the foregoing circuit is verified, and for each $p \in [2^{r_c}]$, a set $$F_k^{(p)}$$

is defined:

$$F_k^{(p)} = \{s: s \in F_k \text{ and } s = c_p^i t_i^{(k)}, i \in [r_t]\}. \tag{12.}$$

It can be concluded from the definition of $F_k$ in equation (6) that the $$F_k^{(p)}$$

satisfies:

$$F_k^{(i)} \cap F_k^{(j)} = \emptyset, \text{ where } i \ne j \in [2^{r_c}], \tag{13.}$$

$$F_k = \bigcup_{p \in [2^{r_c}]} F_k^{(p)}. \tag{14.}$$

Next, the implementation of the Gray code cycle operator $U_{GrayCycle}$ by using $C_1, C_2, \ldots, C_{2^{r_c}+i}$ is verified step by step, and the Gray code cycle operator $U_{GrayCycle}$ may refer to equation (12).

$$|x_{control}\rangle_C \left| y^{(k)} \right\rangle_T =$$

$$|x_{control}\rangle_C \left| \langle 0^{r_c} t_1^{(k)}, x\rangle, \langle 0^{r_c} t_2^{(k)}, x\rangle, \cdots, \langle 0^{r_c} t_{r_t}^{(k)}, x\rangle \right\rangle_T =$$

$$|x_{control}\rangle_C \left| \langle c_1^1 t_1^{(k)}, x?|, \langle c_1^2 t_2^{(k)}, x?, \cdots, \langle c_1^{r_t} t_{r_t}^{(k)}, x? \right\rangle_T \overset{C_1}{\to}$$

$$e^{i\sum_{s \in F_k^{(1)}} \langle s, x?| \alpha_s} |x_{control}\rangle_C \left| \langle c_1^1 t_1^{(k)}, x?, \langle c_1^2 t_2^{(k)}, x?|, \cdots, \langle c_1^{r_t} t_{r_t}^{(k)}, x?| \right\rangle_T \overset{C_2}{\to}$$

$$e^{i\sum_{s \in F_k^{(1)} \cup F_k^{(2)}} \langle s, x?| \alpha_s} |x_{control}\rangle_C \left| \langle c_2^1 t_1^{(k)}, x?|, \langle c_2^2 t_2^{(k)}, x?, \cdots, \langle c_2^{r_t} t_{r_t}^{(k)}, x? \right\rangle_T$$

$$\vdots$$

$$\xrightarrow{C_{2^{r_c}}} e^{i\sum_{s \in \bigcup_{p \in [2^{r_c}]} F_k^{(p)}} \langle s, x?| \alpha_s} |x_{control}\rangle_C \Big|$$

$$\left\langle c_{2^{r_c}}^1 t_1^{(k)}, x?|, \langle c_{2^{r_c}}^2 t_2^{(k)}, x?, \cdots, \langle c_{2^{r_c}}^{r_t} t_{r_t}^{(k)}, x?| \right\rangle_T =$$

$$e^{i\sum_{s \in F_k} \langle s, x? \alpha_s} |x_{control}\rangle_C \Big| \langle c_{2^{r_c}}^1 t_1^{(k)}, x?|,$$

$$\left\langle c_{2^{r_c}}^2 t_2^{(k)}, x?, \cdots, \langle c_{2^{r_c}}^{r_t} t_{r_t}^{(k)}, x?| \right\rangle_T \xrightarrow{C_{2^{r_c}+1}}$$

$$e^{i\sum_{s \in F_k} \langle s, x?| \alpha_s} |x_{control}\rangle_C \left| \langle c_1^1 t_1^{(k)}, x?|, \langle c_1^2 t_2^{(k)}, x?|, \cdots, \langle c_1^{r_t} t_{r_t}^{(k)}, x?| \right\rangle_T =$$

$$e^{i\sum_{s \in F_k} \langle s, x? \alpha_s} |x_{control}\rangle_C \left| y^{(k)} \right\rangle_T$$

Circuit depths of the phases of the Gray code cycle phase will be analyzed below.

1) Phase 1 is composed of the first rotation gate circuit acting on different qubits in the target register, so it may be implemented in an one-layer circuit, that is, a circuit depth is 1.

2) Phase $p \in \{2, 3, \ldots, 2^{r_c}\}$ is discussed according to the following different situations.

If in phase p, $h_{1p}=1$, step p.1 may be implemented by the following first double-bit gate circuit:

$$\prod_{i=1}^{r_t} CNOT_{2i}^{2i-1}.$$

Because path restrictions of double-bit gates in the first double-bit gate circuit are disjoint, a circuit depth of the first double-bit gate circuit is 1. Step p.2 may be composed of a rotation gate acting on different qubits in the target register, so it may be implemented in an one-layer rotation gate circuit, that is, a circuit depth of the first rotation gate circuit is 1.

If in phase p, $2 \le h_{1p} \le \tau$, step p.1 may be implemented by the following first double-bit gate circuit:

$$\prod_{i=1}^{r_t - h_{1p}} CNOT_{2i}^{2h_{ip}-1} \prod_{i=r_t-h_{1p}+1}^{r_t} CNOT_{2i}^{h_{ip}+r_t} =$$

-continued $$\prod_{k=1}^{h_{1p}-1}\left(CNOT_{2(h_{1p}-1)\left\lfloor\frac{r_t-1}{h_{1p}-1}\right\rfloor+2k}^{h_{1p}+(h_{1p}-1)\left\lfloor\frac{r_t-k}{h_{1p}-1}\right\rfloor+r_t+k-1}\prod_{i=1}^{\left\lfloor\frac{r_t-k}{h_{1p}-1}\right\rfloor}CNOT_{2(h_{1p}-1)(i-1)+2k}^{2(h_{1p}-1)i+2k-1}\right)$$

Path restrictions of double-bit gates in the double-bit gate circuit $$C_k = CNOT_{2(h_{1p}-1)\left\lfloor\frac{r_t-1}{h_{1p}-1}\right\rfloor+2k}^{h_{1p}+(h_{1p}-1)\left\lfloor\frac{r_t-k}{h_{1p}-1}\right\rfloor+r_t+k-1}\prod_{i=1}^{\left\lfloor\frac{r_t-k}{h_{1p}-1}\right\rfloor}CNOT_{2(h_{1p}-1)(i-1)+2k}^{2(h_{1p}-1)i+2k-1}$$

are disjoint, that is, all the double-bit gates in the double-bit gate circuit may be implemented simultaneously. A distance between a control bit and a target bit of each double-bit gate in $\mathcal{C}_k$ is at most $O(h_{1p}^2)$. Because step p.1 is composed of circuits $\mathcal{C}_1, \ldots, \mathcal{C}_{h_{1p}-1}$, a total circuit depth of step p.1 is $$O(h_{1p}^2).$$

Step p.2 may be composed of a rotation gate acting on different qubits in the target register, so it may be implemented in an one-layer rotation gate circuit. The foregoing $\lfloor\ \rfloor$ represents downward rounding.

If in phase p, $h_{1p}>\tau$, because step p.1 may be implemented by the first double-bit gate circuit, it can be known from the circuit implementation of the invertible linear transformation under path restriction or multi-dimensional grid restriction that a depth of step p.1 under path restriction may be compressed to $O(n^2)$. Step p.2 may be composed of a rotation gate acting on different bits in the target register, so it may be implemented in an one-layer rotation gate circuit.

3) Phase $2^{r_c}+1$ is implemented by the second double-bit gate circuit, and it can be known from the circuit implementation of the invertible linear transformation under path restriction or multi-dimensional grid restriction that a circuit depth of the phase under path restriction may be compressed to $O(n^2)$.

In an embodiment, the electronic device determines a circuit depth of the gate circuit used for implementing the Gray code cycle operator according to the circuit depths corresponding to the first rotation gate circuit, the second rotation gate circuit, the first double-bit gate circuit, and the second double-bit gate circuit, respectively.

For example, it can be known from the properties of the Gray code cycle that in phase $p=2,3,\ldots,2^{r_c}$, $h_{1p}$ appears at most $O(2^{r_c-h_{1p}})$ times, so a total circuit depth of the $2^{r_c}+1$ phases is $$1+\sum_{h_{1p}=1}^{\tau}\left(O(h_{1p}^2)+1\right)\cdot O\left(2^{r_c-h_{1p}}\right)+\sum_{h_{1p}=\tau+1}^{r_c}\left(O(n^2)+1\right)\cdot O\left(2^{r_c-h_{1p}}\right)+O(n^2)=O(2^{r_c}).$$

Therefore, under path restriction, the Gray code cycle operator may be implemented by a gate circuit with a circuit depth of $O(2^{r_c})$.

It is to be pointed out that the foregoing circuit depth is a circuit depth under path restriction, and in the case of multi-dimensional grid restriction, the circuit depth is consistent.

Therefore, the circuit constructions of the generation phase and the Gray code cycle phase may be combined into a circuit construction of the operator $\mathcal{G}_k$ under path restriction, that is, under path restriction or multi-dimensional grid restriction, the second unitary operator $\mathcal{G}_k$ may be implemented by a quantum circuit with a depth of $O(2^{r_c})$, and the quantum circuit may be composed of a single-bit gate (such as a rotation gate) and a double-bit gate.

S706: Determine a third unitary operator used for replacing a qubit of the control register and a qubit of the target register with the $r_c$ qubits and the $r_t$ qubits.

The third unitary operator $$\left(\prod_n^T\right)^\dagger$$

is used for replacing the front $r_c$ qubits with qubits of the control register, and replacing the last $r_t$ qubits with qubits of the target register, that is, $$\left(\prod_n^T\right)^\dagger|x_{control}\rangle_C|x_{target}\rangle_T=|x_{control}\rangle_{\{1,2,\ldots,r_c\}}|x_{target}\rangle_{\{r_c+1,r_c+2,\ldots,n\}}\qquad(15.)$$

Therefore, under path restriction or multi-dimensional grid restriction, the third unitary operator may be implemented by a quantum circuit with a depth of $O(n^2)$.

S708: Generate diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits.

In an embodiment, the electronic device acquires the fourth unitary operator used for restoring the $r_t$ qubits, and the fourth unitary operator acts on the last $r_t$ qubits inputted into the register and restores a quantum state corresponding to the $r_t$ qubits to an input state, that is, $$\mathcal{R}|y^{(\ell)}\rangle_{\{r_c+1,r_c+2,\ldots,n\}}=|y^{(0)}\rangle_{\{r_c+1,r_c+2,\ldots,n\}}.\qquad(16.)$$

The fourth unitary operator $\mathcal{R}$ is an invertible linear transformation on the computing base, the invertible linear transformation may be implemented in a circuit under path restriction, and a double-bit gate circuit of the fourth unitary operator $\mathcal{R}$ is obtained.

After all the first unitary operator, the second unitary operators, the third unitary operator, and the fourth unitary operator are implemented by the corresponding circuits, diagonal unitary matrices of the n qubits may be divided into two parts, which are diagonal unitary matrices of designed circuits and diagonal unitary matrices of undesigned circuits. A diagonal unitary matrix $\Lambda_{r_c}$ of an undesigned circuit may be designed in a recursive manner, which will be specifically described below.

In an embodiment, the electronic device acquires a diagonal unitary matrix operator, which is a diagonal unitary matrix of $r_c$ qubits and satisfies:

$$\Lambda_{r_c}|x_{control}\rangle_{\{1,2,\ldots,r_c\}}=e^{i\sum_{c\in\{0,1\}^{r_c}-\{0^{r_c}\}}\langle c0^{r_t},x\rangle\alpha_{c0^{r_t}}}|x_{control}\rangle_{\{1,2,\ldots,r_c\}}\qquad(17.)$$

Under path restriction or multi-dimensional grid restriction, the diagonal unitary matrix operator may be implemented in a recursive manner. That is, the diagonal unitary matrix operator is taken as a new diagonal unitary matrix, the new diagonal unitary matrix is further resolved in a recursive manner to obtain new first unitary operator, second unitary operator, third unitary operator, fourth unitary operator, and diagonal unitary matrix operator, a circuit is designed according to the new first unitary operator, second unitary operator, third unitary operator, and fourth unitary operator, and so on, until there is no matrix of an undesigned circuit.

Specifically, the electronic device generates a diagonal unitary matrix quantum circuit based on the double-bit gate circuit for implementing the first unitary operator, the quantum circuit for implementing the second unitary operator, the quantum circuit for implementing the third unitary operator, the double-bit gate circuit for implementing the fourth unitary operator, and the diagonal unitary matrix operator corresponding to the $r_c$ qubits. The diagonal unitary matrix operator is implemented in a recursive manner. Under path restriction or multi-dimensional grid restriction, the diagonal unitary matrix $\Lambda_n$ may be implemented by a n-qubit quantum circuit shown in FIG. 5, which has a circuit depth of $O(2^n/n)$.

Verification: first, the accuracy of the circuit framework is verified.

$$\prod\nolimits_n^\tau$$

is enabled to work first, so that the first half and the second half of a current inputted quantum state $|x\rangle$ are respectively replaced into the control register and the target register:

$$\prod\nolimits_n^T |x\rangle \triangleq \prod\nolimits_n^T |x_{control}\rangle_{\{1,2,\ldots,r_c\}} |x_{target}\rangle_{\{r_c+1,r_c+2,\ldots,n\}} = |x_{control}\rangle_C |x_{target}\rangle_T$$

Then, a series of unitary operators $\mathcal{G}_1, \ldots, \mathcal{G}_\ell$ are enabled to work, so that the following transformation may be realized:

$$\begin{aligned} |x\rangle &= |x_{control}\rangle_C |y^{(0)}\rangle_T \\ &\overset{\mathcal{G}_1}{\to} e^{i\sum_{s\in F_1}\langle s,x\rangle\alpha_s} |x_{control}\rangle_C |y^{(1)}\rangle_T \\ &\overset{\mathcal{G}_2}{\to} e^{i\sum_{s\in F_1\cup F_2}\langle s,x\rangle\alpha_s} |x_{control}\rangle_C |y^{(2)}\rangle_T \\ &\overset{\mathcal{G}_\ell}{\to} e^{i\sum_{s\in \bigcup_{k\in[\ell]} f_k}\langle s,x\rangle\alpha_s} |x_{control}\rangle_C |y^{(\ell)}\rangle_T \end{aligned}$$

Subsequently, $$\left(\prod\nolimits_n^\tau\right)^\dagger$$

is enabled to work to restore the first half and the second half of the inputted quantum state to initial positions:

$$e^{i\sum_{s\in\bigcup_{k\in[\ell]}F_k}\langle s,x\rangle\alpha_s} |x_{control}\rangle_C |y^{(\ell)}\rangle_T \xrightarrow{(\prod_n^\tau)^\dagger} e^{i\sum_{s\in\bigcup_{k\in[\ell]}F_k}\langle s,x\rangle\alpha_s} |x_{control}\rangle_{\{1,\ldots,r_c\}} |y^{(\ell)}\rangle_{\{r_c+1,\ldots,n\}}.$$

Next, the operator $\mathcal{R}$ is enabled to work to restore the last $r_t$ qubits to their initial states:

$$e^{i\sum_{s\in\bigcup_{k\in[\ell]}F_k}\langle s,x\rangle\alpha_s} |x_{control}\rangle_{\{1,\ldots,r_c\}} |y^{(\ell)}\rangle_{\{r_c+1,\ldots,n\}} \overset{\mathcal{R}}{\to} e^{i\sum_{s\in\bigcup_{k\in[\ell]}F_k}\langle s,x\rangle\alpha_s} |x_{control}\rangle_{\{1,\ldots,r_c\}} |y^{(0)}\rangle_{\{r_c+1,\ldots,n\}}.$$

Finally, the diagonal unitary matrix $\Lambda_{r_c}$ is implemented recursively:

$$e^{i\sum_{s\in\bigcup_{k\in[\ell]}F_k}\langle s,x\rangle\alpha_s} |x_{control}\rangle_{\{1,\ldots,r_c\}} |y^{(0)}\rangle_{\{r_c+1,\ldots,n\}} \xrightarrow{\Lambda_{r_c}} e^{i\sum_{s\in\left(\bigcup_{k\in[\ell]}F_k\right)\cup\left(\{c0^{r_t}\}_{c\in\{0,1\}^{r_c}-\{0^{r_c}\}}\right)}\langle s,x\rangle\alpha_s} |x_{control}\rangle_{\{1,\ldots,r_c\}} |y^{(0)}\rangle_{\{r_c+1,\ldots,n\}} = e^{i\theta(x)}|x\rangle$$

The foregoing discussion indicates that the circuit framework in FIG. 5 may be implemented in a quantum circuit of $\Lambda_n$ under path restriction.

In an embodiment, the electronic device determines a circuit depth of a quantum state preparation circuit according to the circuit depth of the double-bit gate circuit corresponding to the first unitary operator, the circuit depth of the quantum circuit of the second unitary operator, the circuit depth of the quantum circuit corresponding to the third unitary operator, and the circuit depth of the double-bit gate circuit corresponding to the fourth unitary operator. The circuit depth is $O(2^n/n)$.

A situation where if the circuit depth is $D(n)=O(2^n/n)$, and there is a real number $\alpha>0$, the circuit depth of the operator $\mathcal{G}_k$ is at most $\alpha\cdot 2^{r_c}$ will be verified below. If there is a real number $\beta>0$, the circuit depth of the operator $\mathcal{R}$ is at most $\beta n^2$. Therefore, $D(n)$ satisfies the following recursion formula:

$$D(n) \le \max\{D(r_c),\ \beta\cdot n^2\} + \alpha\cdot 2^{r_c}\cdot\ell \le D(r_c) + \beta\cdot n^2 + \alpha\cdot 2\left\lceil\frac{n}{2}\right\rceil\cdot\left(4\left\lceil\frac{2^{r_t}}{r_t+1}\right\rceil - 1\right) = D(r_c) + O\left(\frac{2^n}{n}\right)$$

It can be concluded from the foregoing recursion formula that $D(n)=O(2^n/n)$.

S710: Combine the diagonal unitary matrix quantum circuits with a single-bit gate to obtain at least two uniform control gates.

S712: Combine the at least two uniform control gates into a quantum state preparation circuit.

In an embodiment, the electronic device may further detect a circuit depth of the quantum state preparation circuit, and the process includes the following specific steps: the electronic device acquires a diagonal unitary matrix; and detects the circuit depth of the quantum state preparation circuit according to the diagonal unitary matrix. When it is determined that the quantum state preparation circuit is capable of implementing the diagonal unitary matrix based on a detection result, a target data vector is acquired; and a quantum state of the target data vector is prepared based on the quantum state preparation circuit. In some implementations, the diagonal unitary matrix may be acquired corresponding to the diagonal unitary matrix quantum circuits.

For example, during preparation of a quantum state, it is necessary to first determine an algorithm, such as a linear equation solving, a recommendation system, a support vector machine, a clustering algorithm, and a Hamiltonian simulation, for which a quantum state needs to be prepared. First, parameters of the algorithm may be vectorized, then obtained data vectors are taken as target data vectors and encoded as a quantum state. For example, a data vector $x=(x_1, \ldots, x_n)^T \in \mathbb{R}^n$ is encoded as a quantum state $$|x\rangle = \frac{1}{\sqrt{\|x\|_2}} \sum_{i=1}^{n} x_i |i\rangle.$$

In this step, the quantum state is prepared, as shown in FIG. 9, so that quantum algorithms, such as quantum linear equations solving, a quantum recommendation system, a quantum support vector machine, a quantum clustering algorithm, and a Hamiltonian simulation, may be obtained.

In the foregoing embodiments, a first unitary operator corresponding to n qubits is determined. The first unitary operator is used for respectively encoding $r_c$ qubits and $r_t$ qubits in the n qubits into a control register and a target register; and n is an integer greater than or equal to 2. At least two second unitary operators used for performing phase shifting on the n qubits are acquired. A third unitary operator used for replacing a qubit of the control register and a qubit of the target register with the $r_c$ qubits and the $r_t$ qubits is determined. Diagonal unitary matrix quantum circuits are generated based on the first unitary operator, the second unitary operators, the third unitary operator, a fourth unitary operator used for restoring the $r_t$ qubits, and a diagonal unitary matrix operator corresponding to the $r_c$ qubits, so that a circuit depth of the diagonal unitary matrix quantum circuit may be effectively reduced. Then, the diagonal unitary matrix quantum circuits are combined with a single-bit gate to obtain at least two uniform control gates. The at least two uniform control gates are combined into a quantum state preparation circuit, so that a circuit depth of the quantum state preparation circuit may be effectively reduced, the quantum state preparation time may be effectively reduced, and the operating efficiency of quantum computation is improved.

It is to be understood that, although the steps are displayed sequentially according to the instructions of the arrows in the flowcharts of the foregoing embodiments, these steps are not necessarily performed sequentially according to the sequence instructed by the arrows. Unless otherwise explicitly specified herein, execution of the steps is not strictly limited, and the steps may be performed in other sequences. Moreover, at least some steps in the foregoing embodiments may include a plurality of sub-steps or a plurality of stages. The sub-steps or stages are not necessarily performed at the same moment but may be performed at different moments. Execution of the sub-steps or stages is not necessarily sequentially performed, but may be performed alternately with other steps or at least some sub-steps or stages of other steps.

Based on the same inventive concept, the embodiments of the present disclosure further provide a quantum state preparation circuit generation apparatus configured to implement the foregoing quantum state preparation circuit generation method. Implementation solutions provided by the apparatus for solving problems are similar to the implementation solutions described in the foregoing method, so specific limitations in one or more embodiments of the quantum state preparation circuit generation apparatus that are provided below may refer to the foregoing limitations on the quantum state preparation circuit generation method, which are not described in detail here.

In an embodiment, as shown in FIG. 10, a quantum state preparation circuit generation apparatus is provided, which includes: a first determination module 1002, a first acquisition module 1004, a second determination module 1006, a generation module 1008, a first combination module 1010, and a second combination module 1012.

The first determination module 1002 is configured to determine a first unitary operator corresponding to n qubits, the first unitary operator being used for respectively encoding $r_c$ qubits and $r_t$ qubits in the n qubits into a control register and a target register, and n being an integer greater than or equal to 2.

The first acquisition module 1004 is configured to acquire at least two second unitary operators used for performing phase shifting on the n qubits.

The second determination module 1006 is configured to determine a third unitary operator used for replacing a qubit of the control register and a qubit of the target register with the $r_c$ qubits and the $r_t$ qubits.

The generation module 1008 is configured to generate diagonal unitary matrix quantum circuits based on the first unitary operator, the second unitary operators, the third unitary operator, a fourth unitary operator for restoring the $r_t$ qubits, and a diagonal unitary matrix operator corresponding to the $r_c$ qubits.

The first combination module 1010 is configured to combine the diagonal unitary matrix quantum circuits with a single-bit gate to obtain at least two uniform control gates.

The second combination module 1012 is configured to combine the at least two uniform control gates into a quantum state preparation circuit.

In an embodiment, under path restriction or multi-dimensional grid restriction, the first unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the second unitary operator includes a Gray code cycle operator and a generation unitary operator. The Gray code cycle operator is used for performing phase shifting on a quantum state of the n qubits through a Gray code cycle corresponding to the $r_c$ qubits. The generation unitary operator is used for transforming, on the $r_t$ qubits, a computing base into an invertible linear transformation in a finite field.

In an embodiment, under path restriction or multi-dimensional grid restriction, the generation unitary operator is implemented by a double-bit gate circuit with a circuit depth of $O(n^2)$. Under path restriction or multi-dimensional grid restriction, the Gray code cycle operator is implemented by a gate circuit with a circuit depth of $O(2^{r_c})$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the Gray code cycle operator includes $2^{r_c}+1$ phases. Phase 1 in the $2^{r_c}+1$ phases is implemented by a first rotation gate circuit acting on an $i^{th}$ qubit of the target register. Phase p in the $2^{r_c}+1$ phases is implemented by a first double-bit gate circuit, and a control bit of a double-bit gate in the first double-bit gate circuit is on an $h_{tip}{}^{th}$ qubit of the control register, and a target bit is on the $i^{th}$ qubit of the target register. Or, phase p in the $2^{r_c}+1$ phases is implemented by a second rotation gate circuit acting on the $i^{th}$ qubit of the target register. Phase $2^{r_c}+1$ in the $2^{r_c}+1$ phases is implemented by a second double-bit gate circuit, and a control bit of a double-bit gate in the second double-bit gate circuit is on an $h_{i1}{}^{th}$ qubit of the control register, and a target bit is on the $i^{th}$ qubit of the target register. $i \in [r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

In an embodiment, a circuit depth of the first rotation gate circuit under path restriction or multi-dimensional grid restriction is 1; a circuit depth of the second rotation gate circuit under path restriction or multi-dimensional grid restriction is 1; a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

In an embodiment, as shown in FIG. 11, the apparatus further includes:

- a third determined module 1014, configured to determine a circuit depth of the gate circuit for implementing the Gray code cycle operator according to the circuit depths corresponding to the first rotation gate circuit, the second rotation gate circuit, the first double-bit gate circuit, and the second double-bit gate circuit, respectively.

In an embodiment, under path restriction or multi-dimensional grid restriction, the third unitary operator is implemented by a quantum circuit with a circuit depth of $O(n^2)$, and the fourth unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, as shown in FIG. 11, the apparatus further includes:

- a fourth determination module 1016, configured to determine a circuit depth of the quantum state preparation circuit according to the circuit depth of the double-bit gate circuit corresponding to the first unitary operator, the circuit depth of the quantum circuit of the second unitary operator, the circuit depth of the quantum circuit corresponding to the third unitary operator, and the circuit depth of the double-bit gate circuit corresponding to the fourth unitary operator, the circuit depth being $O(2^n/n)$.

In an embodiment, as shown in FIG. 11, the apparatus further includes:

- a second acquisition module 1018, configured to acquire a diagonal unitary matrix;
- a detection module 1020, configured to detect the circuit depth of the quantum state preparation circuit through the diagonal unitary matrix,
- the second acquisition module 1018 being further configured to acquire a target data vector when it is determined that the quantum state preparation circuit is capable of implementing the diagonal unitary matrix based on a detection result; and
- a preparation module 1022, configured to prepare a quantum state of the target data vector based on the quantum state preparation circuit.

In the foregoing embodiments, a first unitary operator corresponding to n qubits is determined. The first unitary operator is used for respectively encoding $r_c$ qubits and $r_t$ qubits in the n qubits into a control register and a target register; and n is an integer greater than or equal to 2. At least two second unitary operators used for performing phase shifting on the n qubits are acquired. A third unitary operator used for replacing a qubit of the control register and a qubit of the target register with the $r_c$ qubits and the $r_t$ qubits is determined. Diagonal unitary matrix quantum circuits are generated based on the first unitary operator, the second unitary operators, the third unitary operator, a fourth unitary operator used for restoring the $r_t$ qubits, and a diagonal unitary matrix operator corresponding to the $r_c$ qubits, so that a circuit depth of the diagonal unitary matrix quantum circuit may be effectively reduced. Then, the diagonal unitary matrix quantum circuits are combined with a single-bit gate to obtain at least two uniform control gates. The at least two uniform control gates are combined into a quantum state preparation circuit, so that a circuit depth of the quantum state preparation circuit may be effectively reduced, the quantum state preparation time may be effectively reduced, and the operating efficiency of quantum computation is improved.

All or some of the modules in the foregoing quantum state preparation circuit may be implemented by software, hardware, or a combination of the software and the hardware. The foregoing modules may be embedded in or as one or more processors or circuitry of an electronic device in the form of hardware, or may be stored in a memory of the electronic device in the form of software, so that the processor invokes the foregoing modules to perform operations corresponding to the modules.

In an embodiment, an electronic device is provided, which may be an industrial intelligent device with an internal structure shown in FIG. 12. The electronic device includes a processor, a memory, an input/output (I/O for short) interface, and a communication interface. The processor, the memory, and the I/O interface are connected via a system bus, and the communication interface is connected to the system bus via the I/O interface. The processor of the electronic device is configured to provide computing and control capabilities. The memory of the electronic device includes a non-volatile storage medium and an internal memory. The non-volatile storage medium stores an operating system, a computer program, and a database. The internal memory provides an environment for the operation of the operating system and the computer program in the non-volatile storage medium. The database of the electronic device is configured to store a target data vector. The I/O interface of the electronic device is used for information exchange between the processor and an external device. The communication interface of the electronic device is used for connecting to and communicating with an external terminal through a network. The computer program is executed by the processor to implement a quantum state preparation circuit generation method.

Those skilled in the art may appreciate that the structure shown in FIG. 12 is only a block diagram of a partial structure related to the solution of the present disclosure, and does not constitute a limitation to the electronic device to which the solution of the present disclosure is applied. In a specific electronic device, more or fewer components than those shown in the figure may be included, or some components may be combined, or the components are in a different arrangement.

In an embodiment, a quantum chip is provided, which includes a quantum state preparation circuit implemented by the quantum state preparation circuit generation method of the present disclosure.

In an embodiment, an electronic device is provided, which includes a memory and a processor. The memory stores a computer program that, when executed by the processor, implements the following steps: determining a first unitary operator corresponding to n qubits, the first unitary operator being used for respectively encoding $r_c$ qubits and $r_t$ qubits in the n qubits into a control register and a target register, and n being an integer greater than or equal to 2; acquiring at least two second unitary operators used for performing phase shifting on the n qubits; determining a third unitary operator used for replacing a qubit of the control register and a qubit of the target register with the $r_c$ qubits and the $r_t$ qubits; generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits; combining the diagonal unitary matrix quantum circuits with a single-bit gate to obtain at least two uniform control gate; and combining the at least two uniform control gates into a quantum state preparation circuit.

In an embodiment, under path restriction or multi-dimensional grid restriction, the first unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the second unitary operator includes a Gray code cycle operator and a generation unitary operator. The Gray code cycle operator is used for performing phase shifting on a quantum state of the n qubits through a Gray code cycle corresponding to the $r_c$ qubits. The generation unitary operator is used for transforming, on the $r_t$ qubits, a computing base into an invertible linear transformation in a finite field.

In an embodiment, under path restriction or multi-dimensional grid restriction, the generation unitary operator is implemented by a double-bit gate circuit with a circuit depth of $O(n^2)$. Under path restriction or multi-dimensional grid restriction, the Gray code cycle operator is implemented by a gate circuit with a circuit depth of $O(2^{r_c})$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the Gray code cycle operator includes $2^{r_c}+1$ phases. Phase 1 in the $2^{r_c}+1$ phases is implemented by a first rotation gate circuit acting on an $i^{th}$ qubit of the target register. Phase p in the $2^{r_c}+1$ phases is implemented by a first double-bit gate circuit, and a control bit of a double-bit gate in the first double-bit gate circuit is on an $h_{tip}{}^{th}$ qubit of the control register, and a target bit is on the $i^{th}$ qubit of the target register. Or, phase p in the $2^{r_c}+1$ phases is implemented by a second rotation gate circuit acting on the $i^{th}$ qubit of the target register. Phase $2^{r_c}+1$ in the $2^{r_c}+1$ phases is implemented by a second double-bit gate circuit, and a control bit of a double-bit gate in the second double-bit gate circuit is on an $h_{i1}{}^{th}$ qubit of the control register, and a target bit is on the $i^{th}$ qubit of the target register. $i\in[r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

In an embodiment, a circuit depth of the first rotation gate circuit under path restriction or multi-dimensional grid restriction is 1; a circuit depth of the second rotation gate circuit under path restriction or multi-dimensional grid restriction is 1; a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

In an embodiment, the processor executes the computer program to further implement the following steps: determining a circuit depth of the gate circuit for implementing the Gray code cycle operator according to the circuit depths corresponding to the first rotation gate circuit, the second rotation gate circuit, the first double-bit gate circuit, and the second double-bit gate circuit, respectively.

In an embodiment, under path restriction or multi-dimensional grid restriction, the third unitary operator is implemented by a quantum circuit with a circuit depth of $O(n^2)$, and the fourth unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the processor executes the computer program to further implement the following steps: determining a circuit depth of the quantum state preparation circuit according to the circuit depth of the double-bit gate circuit corresponding to the first unitary operator, the circuit depth of the quantum circuit of the second unitary operator, the circuit depth of the quantum circuit corresponding to the third unitary operator, and the circuit depth of the double-bit gate circuit corresponding to the fourth unitary operator, the circuit depth being $O(2^n/n)$.

In an embodiment, the processor executes the computer program to further implement the following steps: acquiring a diagonal unitary matrix; detecting the circuit depth of the quantum state preparation circuit through the diagonal unitary matrix; acquiring a target data vector when it is determined that the quantum state preparation circuit is capable of implementing the diagonal unitary matrix based on a detection result; and preparing a quantum state of the target data vector based on the quantum state preparation circuit.

In an embodiment, a computer-readable storage medium is provided, which stores a computer program that, when executed by a processor, implements the following steps: determining a first unitary operator corresponding to n qubits, the first unitary operator being used for respectively encoding $r_c$ qubits and $r_t$ qubits in the n qubits into a control register and a target register, and n being an integer greater than or equal to 2; acquiring at least two second unitary operators used for performing phase shifting on the n qubits; determining a third unitary operator used for replacing a qubit of the control register and a qubit of the target register with the $r_c$ qubits and the $r_t$ qubits; generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits; combining the diagonal unitary matrix quantum circuits with a single-bit gate to obtain at least two uniform control gate; and combining the at least two uniform control gates into a quantum state preparation circuit.

In an embodiment, under path restriction or multi-dimensional grid restriction, the first unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the second unitary operator includes a Gray code cycle operator and a generation unitary operator. The Gray code cycle operator is used for performing phase shifting on a quantum state of the n qubits through a Gray code cycle corresponding to the $r_c$ qubits. The generation unitary operator is used for transforming, on the $r_t$ qubits, a computing base into an invertible linear transformation in a finite field.

In an embodiment, under path restriction or multi-dimensional grid restriction, the generation unitary operator is implemented by a double-bit gate circuit with a circuit depth of $O(n^2)$. Under path restriction or multi-dimensional grid restriction, the Gray code cycle operator is implemented by a gate circuit with a circuit depth of $O(2^{r_c})$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the Gray code cycle operator includes $2^{r_c}+1$ phases. Phase 1 in the $2^{r_c}+1$ phases is implemented by a first rotation gate circuit acting on an $i^{th}$ qubit of the target register. Phase p in the $2^{r_c}+1$ phases is implemented by a first double-bit gate circuit, and a control bit of a double-bit gate in the first double-bit gate circuit is on an $h_{tip}^{th}$ qubit of the control register, and a target bit is on the $i^{th}$ qubit of the target register. Or, phase p in the $2^{r_c}+1$ phases is implemented by a second rotation gate circuit acting on the $i^{th}$ qubit of the target register. Phase $2^{r_c}+1$ in the $2^{r_c}+1$ phases is implemented by a second double-bit gate circuit, and a control bit of a double-bit gate in the second double-bit gate circuit is on an $h_{i1}^{th}$ qubit of the control register, and a target bit is on the ith qubit of the target register. $i \in [r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

In an embodiment, a circuit depth of the first rotation gate circuit under path restriction or multi-dimensional grid restriction is 1; a circuit depth of the second rotation gate circuit under path restriction or multi-dimensional grid restriction is 1; a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

In an embodiment, the computer program is executed by the processor to further implement the following steps: determining a circuit depth of the gate circuit for implementing the Gray code cycle operator according to the circuit depths corresponding to the first rotation gate circuit, the second rotation gate circuit, the first double-bit gate circuit, and the second double-bit gate circuit, respectively.

In an embodiment, under path restriction or multi-dimensional grid restriction, the third unitary operator is implemented by a quantum circuit with a circuit depth of $O(n^2)$, and the fourth unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the computer program is executed by the processor to further implement the following steps: determining a circuit depth of the quantum state preparation circuit according to the circuit depth of the double-bit gate circuit corresponding to the first unitary operator, the circuit depth of the quantum circuit of the second unitary operator, the circuit depth of the quantum circuit corresponding to the third unitary operator, and the circuit depth of the double-bit gate circuit corresponding to the fourth unitary operator, the circuit depth being $O(2^n/n)$.

In an embodiment, the computer program is executed by the processor to further implement the following steps: acquiring a diagonal unitary matrix; detecting the circuit depth of the quantum state preparation circuit through the diagonal unitary matrix; acquiring a target data vector when it is determined that the quantum state preparation circuit is capable of implementing the diagonal unitary matrix based on a detection result; and preparing a quantum state of the target data vector based on the quantum state preparation circuit.

In an embodiment, a computer program product is provided, which includes a computer program that, when executed by a processor, implements the following steps: determining a first unitary operator corresponding to n qubits, the first unitary operator being used for respectively encoding $r_c$ qubits and $r_t$ qubits in the n qubits into a control register and a target register, and n being an integer greater than or equal to 2; acquiring at least two second unitary operators used for performing phase shifting on the n qubits; determining a third unitary operator used for replacing a qubit of the control register and a qubit of the target register with the $r_c$ qubits and the $r_t$ qubits; generating diagonal unitary matrix quantum circuits based on the first unitary operator, the second unitary operators, the third unitary operator, a fourth unitary operator used for restoring the $r_t$ qubits, and a diagonal unitary matrix operator corresponding to the $r_c$ qubits; combining the diagonal unitary matrix quantum circuits with a single-bit gate to obtain at least two uniform control gate; and combining the at least two uniform control gates into a quantum state preparation circuit.

In an embodiment, under path restriction or multi-dimensional grid restriction, the first unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the second unitary operator includes a Gray code cycle operator and a generation unitary operator. The Gray code cycle operator is used for performing phase shifting on a quantum state of the n qubits through a Gray code cycle corresponding to the $r_c$ qubits. The generation unitary operator is used for transforming, on the $r_t$ qubits, a computing base into an invertible linear transformation in a finite field.

In an embodiment, under path restriction or multi-dimensional grid restriction, the generation unitary operator is implemented by a double-bit gate circuit with a circuit depth of $O(n^2)$. Under path restriction or multi-dimensional grid restriction, the Gray code cycle operator is implemented by a gate circuit with a circuit depth of $O(2^{r_c})$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the Gray code cycle operator includes $2^{r_c}+1$ phases. Phase 1 in the $2^{r_c}+1$ phases is implemented by a first rotation gate circuit acting on an $i^{th}$ qubit of the target register. Phase p in the $2^{r_c}+1$ phases is implemented by a first double-bit gate circuit, and a control bit of a double-bit gate in the first double-bit gate circuit is on an $h_{ip}{}^{th}$ qubit of the control register, and a target bit is on the ith qubit of the target register. Or, phase p in the $2^{r_c}+1$ phases is implemented by a second rotation gate circuit acting on the $i^{th}$ qubit of the target register. Phase $2^{r_c}+1$ in the $2^{r_c}+1$ phases is implemented by a second double-bit gate circuit, and a control bit of a double-bit gate in the second double-bit gate circuit is on an $h_{i1}{}^{th}$ qubit of the control register, and a target bit is on the $i^{th}$ qubit of the target register. $i \in [r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

In an embodiment, a circuit depth of the first rotation gate circuit under path restriction or multi-dimensional grid restriction is 1; a circuit depth of the second rotation gate circuit under path restriction or multi-dimensional grid restriction is 1; a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

In an embodiment, the computer program is executed by the processor to further implement the following steps: determining a circuit depth of the gate circuit for implementing the Gray code cycle operator according to the circuit depths corresponding to the first rotation gate circuit, the second rotation gate circuit, the first double-bit gate circuit, and the second double-bit gate circuit, respectively.

In an embodiment, under path restriction or multi-dimensional grid restriction, the third unitary operator is implemented by a quantum circuit with a circuit depth of $O(n^2)$, and the fourth unitary operator is implemented by a double-bit gate circuit with a circuit depth of $O(n^2)$. The path restriction represents that the double-bit gate circuit acts on two adjacent qubits that are qubits in n qubits arranged in a line. The multi-dimensional grid restriction represents that the double-bit gate circuit acts on two adjacent qubits that are qubits in n qubits arranged in a multi-dimensional grid.

In an embodiment, the computer program is executed by the processor to further implement the following steps: determining a circuit depth of the quantum state preparation circuit according to the circuit depth of the double-bit gate circuit corresponding to the first unitary operator, the circuit depth of the quantum circuit of the second unitary operator, the circuit depth of the quantum circuit corresponding to the third unitary operator, and the circuit depth of the double-bit gate circuit corresponding to the fourth unitary operator, the circuit depth being $O(2^n/n)$.

In an embodiment, the computer program is executed by the processor to further implement the following steps: acquiring a diagonal unitary matrix; detecting the circuit depth of the quantum state preparation circuit through the diagonal unitary matrix; acquiring a target data vector when it is determined that the quantum state preparation circuit is capable of implementing the diagonal unitary matrix based on a detection result; and preparing a quantum state of the target data vector based on the quantum state preparation circuit.

User information (including but not limited to, user device information, user personal information, and the like) and data (including but not limited to, data for analysis, stored data, displayed data, and the like) that are involved in the present disclosure are information and data authorized by users or fully authorized by all parties, and the collection, use and processing of relevant data shall comply with the relevant laws and regulations and standards of relevant countries and regions.

Those of ordinary skill in the art may understand that all or some of processes of the method in the foregoing embodiments may be implemented by a computer program instructing relevant hardware. The computer program may be stored in a non-volatile (or non-transitory) computer-readable storage medium. When the computer program is executed, the processes of the foregoing method embodiments may be implemented. References to the memory, the database, or other media used in the embodiments provided in the present disclosure may all include at least one of non-volatile and volatile memories. The non-volatile memory may include a read-only memory (ROM), a magnetic tape, a floppy disk, a flash memory, an optical memory, a high-density embedded non-volatile memory, a resistive random access memory (ReRAM), a magnetoresistive random access memory (MRAM), a ferroelectric random access memory (FRAM), a phase change memory (PCM), a graphene memory, and the like. The volatile memory may include a random access memory (RAM) serving, an external cache memory, and the like. As an illustration and not a limitation, the RAM may be in various forms, such as a static random access memory (SRAM) and dynamic random access memory (DRAM). The database involved in the embodiments provided in the present disclosure may include at least one of a relational database and a non-relational database. The non-relational database may include, but is limited to, a distributed database based on a blockchain. The processor involved in the embodiments provided in the present disclosure may include, but is not limited to, a general-purpose processor, a central processing unit, a graphics processing unit, a digital signal processor, a programmable logic device, a data processing logic device based on quantum computation, and the like.

Technical features of the foregoing embodiments may be randomly combined. To make description concise, not all possible combinations of the technical features in the foregoing embodiments are described. However, the combinations of these technical features shall be considered as falling within the scope recorded by this description provided that no conflict exists.

The foregoing embodiments show only several implementations of the present disclosure and are described in detail, which, however, are not to be construed as a limitation to the patent scope of the present disclosure. It is to be pointed out that those of ordinary skill in the art may further make several transformations and improvements without departing from the idea of the present disclosure, and these transformations and improvements shall fall within the scope of protection of the present disclosure. Therefore, the scope of protection of the present disclosure shall be subject to the appended claims.

What is claimed is:

1. A method for generating a quantum state preparation circuit, performed by an electronic device, the method comprising:

determining a first unitary operator corresponding to n qubits, the first unitary operator for respectively encoding $r_c$ qubits and $r_t$ qubits in the n qubits into a control register and a target register, and n being an integer greater than or equal to 2;

acquiring at least two second unitary operators for performing phase shifting on the n qubits;

determining a third unitary operator for replacing a qubit of the control register and a qubit of the target register;

generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits;

combining the diagonal unitary matrix quantum circuits with a single-bit gate to obtain at least two uniform control gates; and combining the at least two uniform control gates into a quantum state preparation circuit.

2. The method according to claim 1, wherein:

in response to path restriction or multi-dimensional grid restriction, the first unitary operator is implemented by a double-bit gate circuit with a circuit depth of $O(n^2)$, wherein:

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

3. The method according to claim 1, wherein:

the second unitary operator comprises a Gray code cycle operator and a generation unitary operator, wherein:

the Gray code cycle operator performs phase shifting on a quantum state of the n qubits through a Gray code cycle corresponding to the $r_c$ qubits; and the generation unitary operator transforms, on the $r_t$ qubits, a computing base into an invertible linear transformation in a finite field.

4. The method according to claim 3, wherein:

under path restriction or multi-dimensional grid restriction, the generation unitary operator is implemented by a double-bit gate circuit with a circuit depth of $O(n^2)$;

under path restriction or multi-dimensional grid restriction, the Gray code cycle operator is implemented by a gate circuit with a circuit depth of $O(2^{r_c})$;

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

5. The method according to claim 3, wherein:

the Gray code cycle operator comprises $2^{r_c}+1$ phases, wherein:

phase 1 in the $2^{r_c}+1$ phases is implemented by a first rotation gate circuit acting on an $i^{th}$ qubit of the target register;

phase p in the $2^{r_c}+1$ phases is implemented by a first double-bit gate circuit, and a control bit of a double-bit gate in the first double-bit gate circuit is on an $h_{ip}^{th}$ qubit of the control register, and a target bit is on the $i^{th}$ qubit of the target register; or, phase p in the $2^{r_c}+1$ phases is implemented by a second rotation gate circuit acting on the $i^{th}$ qubit of the target register;

phase $2^{r_c}+1$ in the $2^{r_c}+1$ phases is implemented by a second double-bit gate circuit, and a control bit of a double-bit gate in the second double-bit gate circuit is on an $h_{i1}^{th}$ qubit of the control register, and a target bit is on the $i^{th}$ qubit of the target register; and $i \in [r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

6. The method according to claim 5, wherein:

a circuit depth of the first rotation gate circuit under path restriction or multi-dimensional grid restriction is 1;

a circuit depth of the second rotation gate circuit under path restriction or multi-dimensional grid restriction is 1;

a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

7. The method according to claim 6, further comprising:

determining a circuit depth of the gate circuit for implementing the Gray code cycle operator according to the circuit depths corresponding to the first rotation gate circuit, the second rotation gate circuit, the first double-bit gate circuit, and the second double-bit gate circuit, respectively.

8. The method according to claim 1, wherein:

under path restriction or multi-dimensional grid restriction, the third unitary operator is implemented by a quantum circuit with a circuit depth of $O(n^2)$, and the fourth unitary operator is implemented by a double-bit gate circuit with a circuit depth of $O(n^2)$;

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

9. The method according to claim 1, further comprising:

determining a circuit depth of the quantum state preparation circuit according to a circuit depth of a double-bit gate circuit corresponding to the first unitary operator, a circuit depth of a quantum circuit of the second unitary operator, a circuit depth of a quantum circuit corresponding to the third unitary operator, and a circuit depth of a double-bit gate circuit corresponding to the fourth unitary operator, the circuit depth being $O(2^n/n)$.

10. The method according to claim 9, further comprising:

acquiring a diagonal unitary matrix corresponding to the diagonal unitary matrix quantum circuits;

detecting the circuit depth of the quantum state preparation circuit through the diagonal unitary matrix;

acquiring a target data vector when it is determined that the quantum state preparation circuit is capable of implementing the diagonal unitary matrix based on a detection result; and preparing a quantum state of the target data vector based on the quantum state preparation circuit.

11. An apparatus for generating a quantum state preparation circuit, the apparatus comprising:

a memory storing instructions; and a processor in communication with the memory, wherein, when the processor executes the instructions, the processor is configured to cause the apparatus to perform:

determining a first unitary operator corresponding to n qubits, the first unitary operator for respectively encoding $r_c$ qubits and $r_t$ qubits in the n qubits into a control register and a target register, and n being an integer greater than or equal to 2;

acquiring at least two second unitary operators for performing phase shifting on the n qubits;

determining a third unitary operator for replacing a qubit of the control register and a qubit of the target register;

generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits;

combining the diagonal unitary matrix quantum circuits with a single-bit gate to obtain at least two uniform control gates; and combining the at least two uniform control gates into a quantum state preparation circuit.

12. The apparatus according to claim 11, wherein:

in response to path restriction or multi-dimensional grid restriction, the first unitary operator is implemented by a double-bit gate circuit with a circuit depth of $O(n^2)$, wherein:

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

13. The apparatus according to claim 11, wherein:

the second unitary operator comprises a Gray code cycle operator and a generation unitary operator, wherein:

the Gray code cycle operator performs phase shifting on a quantum state of the n qubits through a Gray code cycle corresponding to the $r_c$ qubits; and the generation unitary operator transforms, on the $r_t$ qubits, a computing base into an invertible linear transformation in a finite field.

14. The apparatus according to claim 13, wherein:

under path restriction or multi-dimensional grid restriction, the generation unitary operator is implemented by a double-bit gate circuit with a circuit depth of $O(n^2)$;

under path restriction or multi-dimensional grid restriction, the Gray code cycle operator is implemented by a gate circuit with a circuit depth of $O(2^{r_c})$;

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

15. The apparatus according to claim 13, wherein:

the Gray code cycle operator comprises $2^{r_c}+1$ phases, wherein:

phase 1 in the $2^{r_c}+1$ phases is implemented by a first rotation gate circuit acting on an $i^{th}$ qubit of the target register;

phase p in the $2^{r_c}+1$ phases is implemented by a first double-bit gate circuit, and a control bit of a double-bit gate in the first double-bit gate circuit is on an $h_{tip}{}^{th}$ qubit of the control register, and a target bit is on the $i^{th}$ qubit of the target register; or, phase p in the $2^{r_c}+1$ phases is implemented by a second rotation gate circuit acting on the $i^{th}$ qubit of the target register;

phase $2^{r_c}+1$ in the $2^{r_c}+1$ phases is implemented by a second double-bit gate circuit, and a control bit of a double-bit gate in the second double-bit gate circuit is on an $h_{i1}{}^{th}$ qubit of the control register, and a target bit is on the $i^{th}$ qubit of the target register; and $i \in [r_t, n]$, and $h_{ip}$ and $h_{i1}$ represent a subscript of a different bit between adjacent bit strings in an n bit string sequence, or a subscript of a different bit between the first bit string and the last bit string in the n bit string sequence.

16. The apparatus according to claim 15, wherein:

a circuit depth of the first rotation gate circuit under path restriction or multi-dimensional grid restriction is 1;

a circuit depth of the second rotation gate circuit under path restriction or multi-dimensional grid restriction is 1;

a circuit depth of the first double-bit gate circuit under path restriction or multi-dimensional grid restriction is $O(n^2)$; and a circuit depth of the second double-bit gate circuit under path restriction or multi-dimensional grid restriction is $O(2^{r_c})$.

17. A non-transitory computer-readable storage medium, storing computer-readable instructions, wherein, the computer-readable instructions, when executed by a processor, are configured to cause the processor to perform:

determining a first unitary operator corresponding to n qubits, the first unitary operator for respectively encoding $r_c$ qubits and $r_t$ qubits in the n qubits into a control register and a target register, and n being an integer greater than or equal to 2;

acquiring at least two second unitary operators for performing phase shifting on the n qubits;

determining a third unitary operator for replacing a qubit of the control register and a qubit of the target register;

generating diagonal unitary matrix quantum circuits based on the first unitary operator, the second unitary operators, the third unitary operator, a fourth unitary operator, and a diagonal unitary matrix operator, wherein the fourth unitary operator restores the $r_t$ qubits and the diagonal unitary matrix operator corresponds to the $r_c$ qubits;

combining the diagonal unitary matrix quantum circuits with a single-bit gate to obtain at least two uniform control gates; and combining the at least two uniform control gates into a quantum state preparation circuit.

18. The non-transitory computer-readable storage medium according to claim 17, wherein:

in response to path restriction or multi-dimensional grid restriction, the first unitary operator is implemented by a double-bit gate circuit with a circuit depth of $O(n^2)$, wherein:

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

19. The non-transitory computer-readable storage medium according to claim 17, wherein:

the second unitary operator comprises a Gray code cycle operator and a generation unitary operator, wherein:

the Gray code cycle operator performs phase shifting on a quantum state of the n qubits through a Gray code cycle corresponding to the $r_c$ qubits; and the generation unitary operator transforms, on the $r_t$ qubits, a computing base into an invertible linear transformation in a finite field.

20. The non-transitory computer-readable storage medium according to claim 19, wherein:

under path restriction or multi-dimensional grid restriction, the generation unitary operator is implemented by a double-bit gate circuit with a circuit depth of $O(n^2)$;

under path restriction or multi-dimensional grid restriction, the Gray code cycle operator is implemented by a gate circuit with a circuit depth of $O(2^{r_c})$;

the path restriction represents that the double-bit gate circuit acts on two adjacent qubits that are qubits in the n qubits arranged in a line; and the multi-dimensional grid restriction represents that the double-bit gate circuit acts on two adjacent qubits that are qubits in the n qubits arranged in a multi-dimensional grid.

* * * * *